(12) United States Patent
Kasahara et al.

(10) Patent No.: US 10,115,210 B2
(45) Date of Patent: Oct. 30, 2018

(54) DISPLAY CONTROL DEVICE, DISPLAY CONTROL METHOD, AND PROGRAM

(71) Applicant: SONY CORPORATION, Tokyo (JP)

(72) Inventors: Shunichi Kasahara, Kanagawa (JP); Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 231 days.

(21) Appl. No.: 14/521,523

(22) Filed: Oct. 23, 2014

(65) Prior Publication Data

US 2015/0130838 A1    May 14, 2015

(30) Foreign Application Priority Data

Nov. 13, 2013  (JP) ................... 2013-234931

(51) Int. Cl.
  *G06T 11/60*  (2006.01)
  *G06T 11/00*  (2006.01)
  *G06K 9/00*   (2006.01)

(52) U.S. Cl.
  CPC .......... *G06T 11/00* (2013.01); *G06K 9/00604* (2013.01); *G06K 9/00671* (2013.01)

(58) Field of Classification Search
  None
  See application file for complete search history.

(56) References Cited

U.S. PATENT DOCUMENTS

| | | | |
|---|---|---|---|
| 2003/0156124 A1* | 8/2003 | Good | G06F 17/27 345/620 |
| 2008/0077597 A1* | 3/2008 | Butler | G06F 17/30265 |
| 2010/0156933 A1* | 6/2010 | Jones | G06Q 30/02 345/629 |
| 2010/0226564 A1* | 9/2010 | Marchesotti | G06F 17/30256 382/159 |
| 2011/0109650 A1* | 5/2011 | Kreeger | G06F 19/3406 345/634 |
| 2012/0299962 A1* | 11/2012 | White | G02B 27/017 345/633 |

FOREIGN PATENT DOCUMENTS

JP    2012-212345    11/2012

* cited by examiner

*Primary Examiner* — Tize Ma
(74) *Attorney, Agent, or Firm* — Paratus Law Group, PLLC

(57) ABSTRACT

There is provided a display control device including an image acquiring section configured to acquire a moving image shot from a viewpoint changing from moment to moment, a spatial position specifying section configured to specify a spatial position in a first frame of the moving image, and a display control section configured to display the moving image, in such a manner to maintain the spatial position in a predetermined state in a second frame after the first frame.

17 Claims, 18 Drawing Sheets

DISPLAY CONTROL DEVICE, DISPLAY CONTROL METHOD, AND PROGRAM

CROSS REFERENCE TO RELATED APPLICATIONS

This application claims the benefit of Japanese Priority Patent Application JP 2013-234931 filed Nov. 13, 2013, the entire contents of which are incorporated herein by reference.

BACKGROUND

The present disclosure relates to a display control device, a display control method, and a program.

In recent years, the technology called augmented reality (AR) which presents a user additional information superimposed on the real world is attracting attention. The information presented to the user in the AR technology is also called annotation, and can be visualized using virtual objects of various forms such as a text, an icon, and an animation. For example, JP 2012-212345A discloses a technology to realize the operation of the virtual object of AR, without impairing a sense of immersion of the user in the AR space.

SUMMARY

The AR technology proposed in above Patent Literature 1 and others is still in the early days of development, and the technology for utilizing AR in various situation has not been proposed sufficiently. For example, the technology for providing the user with more appropriate information, utilizing the AR technology is one of what are not proposed sufficiently.

Therefore, the present disclosure proposes a novel and improved image processing device, an image processing method, and a program capable of providing the user with more appropriate information, utilizing the AR technology.

According to an embodiment of the present disclosure, there is provided a display control device including an image acquiring section configured to acquire a moving image shot from a viewpoint changing from moment to moment, a spatial position specifying section configured to specify a spatial position in a first frame of the moving image, and a display control section configured to display the moving image, in such a manner to maintain the spatial position in a predetermined state in a second frame after the first frame.

According to another embodiment of the present disclosure, there is provided a display control method including acquiring a moving image shot from a viewpoint changing from moment to moment, specifying a spatial position in a first frame of the moving image, and displaying the moving image in such a manner to maintain the spatial position in a predetermined state in a second frame after the first frame.

According to still another embodiment of the present disclosure, there is provided a program for causing a computer to implement a function to acquire a moving image shot from a viewpoint changing from moment to moment, a function to specify a spatial position in a first frame of the moving image, and a function to display the moving image in such a manner to maintain the spatial position in a predetermined state in a second frame after the first frame.

According to one or more embodiments of the present disclosure as described above, more appropriate information is provided to the user, utilizing the AR technology.

DETAILED DESCRIPTION OF THE EMBODIMENT(S)

Figure 1:
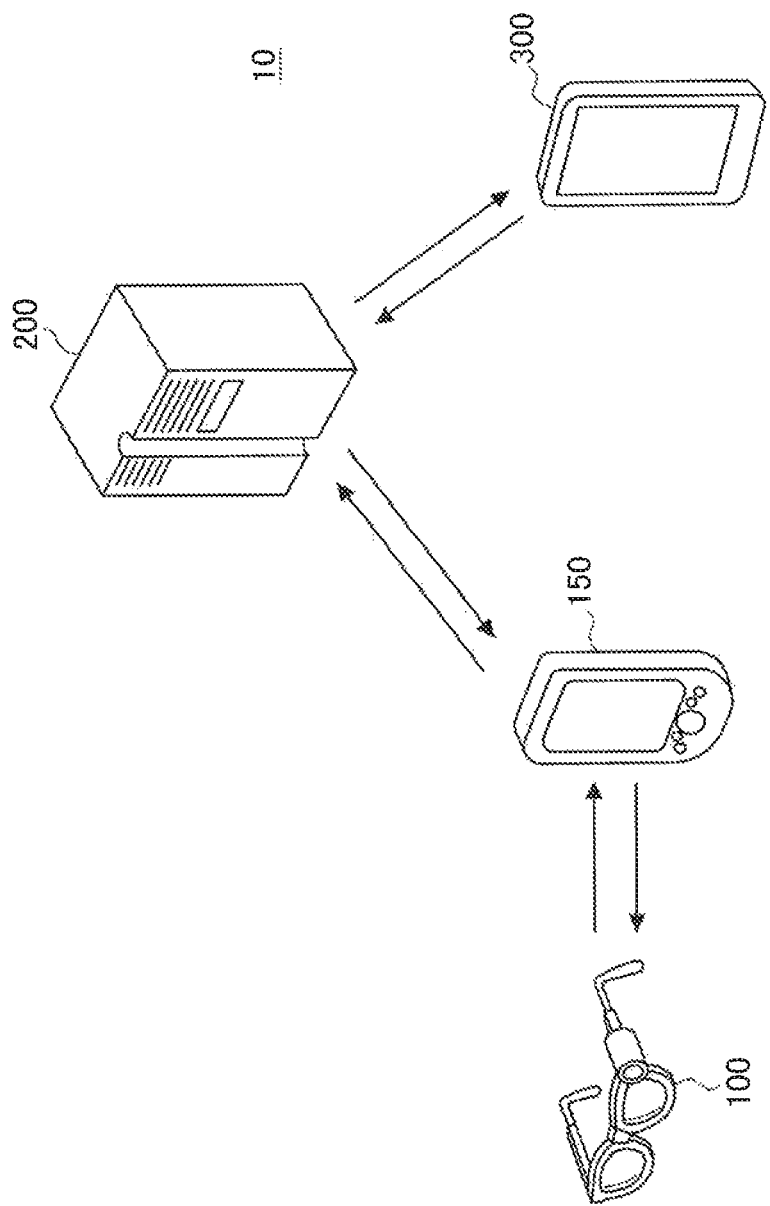
FIG. 1 is a diagram illustrating a schematic configuration of a system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. First Embodiment
 1-1. System Configuration
 1-2. Device Configuration
 1-3. Functional Configuration 1-4. Exemplary Display
1-5. Variant Example
2. Second Embodiment
3. Third Embodiment
   3-1. Functional Configuration
   3-2. Exemplary Display
   3-3. Variant Example
4. Hardware Configuration
5. Supplement

1. First Embodiment

1-1. System Configuration

FIG. 1 is a diagram illustrating a schematic configuration of a system according to the first embodiment of the present disclosure. Referring to FIG. 1, the system 10 includes a wearable display 100, a smartphone 150, a server 200, and a tablet terminal 300. The wearable display 100 and the smartphone 150 are connected by Bluetooth (registered trademark) for example. Also, the server 200 is connected with the smartphone 150 and the tablet terminal 300 by various types of wired or wireless networks.

In the system 10, the moving image shot by a camera (head mounted camera) mounted on the wearable display 100 of glasses type worn by the first user is delivered by streaming in real time via the smartphone 150 and the server 200 to the tablet terminal 300. The scope, the inclination and others of the delivered moving image are processed to correspond to the sight of the first user. In this way, the second user browsing the moving image at the tablet terminal 300 can have an experience as if sharing the visual perception with the first user.

Further, the second user browsing the moving image at the tablet terminal 300 can be able to input an annotation to the moving image delivered by streaming. The annotation is for example the information presented in addition to the real space picture that the first user is viewing, and may take various types of forms such as a text, an icon, and an animation. By the input of the annotation, the second user can make a comment on what appears in the sight of the first user, and provide the information with the first user, for example. That is, the second user can interfere with the experience of the first user by the annotation.

The annotation input by the second user at the tablet terminal 300 is transmitted via the server 200 to the smartphone 150, and is displayed in the sight of the first user at the wearable display 100 by the control of the smartphone 150. The annotation may be displayed in the sight of the first user transparently, and may be combined with the image displayed toward the first user. In this way, in the system 10, the interaction between the users is established with the moving image delivered by streaming as a medium.

1-2. Device Configuration

Figure 2:
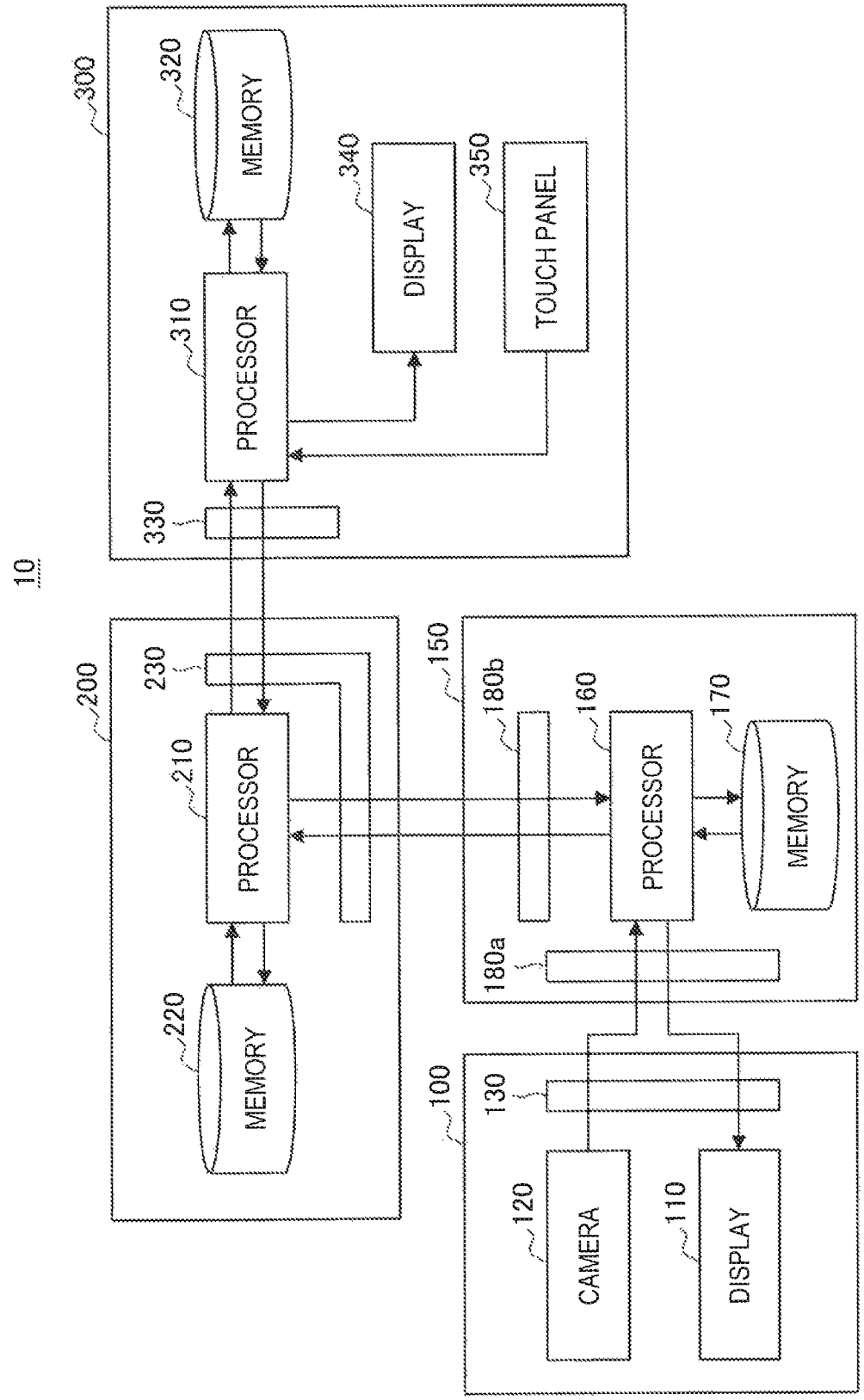
FIG. 2 is a diagram illustrating a schematic configuration of devices according to a first embodiment of the present disclosure.

FIG. 2 is a diagram illustrating the schematic configuration of devices according to the first embodiment of the present disclosure. Note that the components of each device are depicted solely with regard to the part related to the function of the embodiment described below, and each device may further include components not illustrated in the drawing. With regard to the more detailed configuration of each device, refer to the description of the hardware configuration of the information processing apparatus described later. In the following, with reference to FIG. 2, description will be made of the configuration of each device included in the system 10.

(Wearable Display)

The wearable display 100 includes a display 110, a camera 120, and a communication section 130.

The display 110 is for example an LCD or an organic EL display, and presents various types of information to the first user wearing the wearable display 100. More specifically, the display 110 may be a transparent display, or may be a display of the closed type. When the display 110 is of the transparent type, the first user views the surrounding real space directly through the display 110. The display 110 electronically displays the additional information such as the annotation, in order to superimpose the additional information on the real space picture. On the other hand, when the display 110 is of the closed type, the first user indirectly views the surrounding real space, by the real space image in which the moving image shot by the camera 120 is processed to correspond to the sight of the first user. The display 110 displays the image in which the additional information such as the annotation is combined with the real space image. Note that, in the following description, the display 110 can be any of the transparent type and the closed type, unless otherwise described.

The camera 120 is the head mounted camera described above. The moving image shot by the camera 120 is processed to correspond to the sight of the first user by the processor of any of the devices described later for example, and then is displayed in the tablet terminal 300 toward the second user. Also, for example, when the display 110 is of the closed type, the image generated by processing the moving image shot by the camera 120 is displayed toward the first user as well. Since the wearable display 100 moves according to the movement of the head of the first user, the viewpoint of the moving image shot by the camera 120 also changes from moment to moment, and in each frame of the moving image, the scope of the real space included in the image, and the angle of the image in relation to the real space differ.

The communication section 130 is a communication circuit that executes communication by Bluetooth (registered trademark) with the communication section 180a of the smartphone 150. In the present embodiment, the display 110 or the camera 120 in the wearable display 100 are remotely controlled by the smartphone 150.

Note that, in another embodiment, the wearable display 100 may include a processor and a memory for the control of the display 110 or the camera 120 and for other information processing. Also, further in another embodiment, the display or the camera in the smartphone 150 may be used instead of the wearable display 100. That is, the function of the wearable display 100 and the smartphone 150 in the present embodiment may be implemented by a single device including a display, a camera, a processor, and a memory, or may be implemented dispersedly in a plurality of devices as in the example illustrated in the drawing.

(Smartphone)

The smartphone 150 includes a processor 160, a memory 170, and a communication section 180.

The processor 160 executes various types of information processing in the smartphone 150. For example, the processor 160 executes the control to display the annotation received from the server 200 via the communication section 180b, on the display 110 of the wearable display 100. Also, the processor 160 may process the moving image shot by the camera 120 of the wearable display 100, in order to deliver the moving image via the server 200 to the tablet terminal 300. In the memory 170, various types of data used for the processing in the processor 160 is stored.

Note that, in the present embodiment, the respective functions implemented by the processor 160 of the smartphone 150, the processor 210 of the server 200, and the processor 310 of the tablet terminal 300 are compatible. Accordingly, for example, the function described as being implemented by the processor 160 may be implemented by the processor 210 or the processor 310 in another embodiment. Likewise, the function described as being implemented by the processor 210 may be implemented by the processor 160 or the processor 310 in another embodiment. Also, the function described as being implemented by the processor 310 may be realized by the processor 160 or the processor 210 in other embodiments. The data stored in the memory 170 of the smartphone 150, the memory 220 of the server 200, and the memory 320 of the tablet terminal 300 in each embodiment differs depending on the function implemented by the processor of each device.

The communication section 180 includes a communication section 180a which is a communication circuit that executes communication by Bluetooth (registered trademark) with the communication section 130 of the wearable display 100, and a communication section 180b which is a communication circuit that executes network communication with the communication section 230 of the server 200. The network communication between the communication section 180b and the communication section 230 can be executed via various types of wired or the wireless networks such as Wi-Fi, a portable phone network, and the Internet. The same thing can be applied to the network communication between the communication section 230 and the communication section 330 of the tablet terminal 300.

(Server)

The server 200 includes a processor 210, a memory 220, and a communication section 230.

The processor 210 executes various types of information processing in the server 200. For example, the processor 210 forwards the annotation received from the tablet terminal 300 via the communication section 230, to the smartphone 150. For example, when the moving image is delivered from a single wearable display 100 to a plurality of the tablet terminals 300, the server 200 may collect the annotations input at each tablet terminal 300 and forward the annotations to the smartphone 150. Also, the processor 210 delivers the moving image received from the smartphone 150 via the communication section 230, to one or a plurality of the tablet terminals 300. In the memory 220, various types of data used for the processing in the processor 210 is stored.

The communication section 230 is the communication circuit that executes the network communication with the communication section 180b of the smartphone 150, and with the communication section 330 of the tablet terminal 300.

(Tablet Terminal)

The tablet terminal 300 includes a processor 310, a memory 320, a communication section 330, a display 340, and a touch panel 350.

The processor 310 executes various types of information processing in the tablet terminal 300. For example, the processor 310 executes the control to display the moving image received from the server 200 via the communication section 330, on the display 340. Also, for example, the processor 310 transmits the annotation input by the second user via the touch panel 350, via the communication section 330 to the server 200. The annotation may be input for a specific position or an object in the moving image. In the memory 320, various types of data used for the processing in the processor 310 is stored.

The communication section 330 is a communication circuit that executes network communication with the communication section 230 of the server 200.

The display 340 is an LCD or an organic EL display for example, and presents various types of the information in accordance with the control of the processor 310. For example, the display 340 displays the moving image corresponding to the sight of the first user, which is generated on the basis of the image shot by the camera 120 of the wearable display 100. Also, the display 340 may display a graphical user interface (GUI) for the second user to input the annotation to the moving image.

The touch panel 350 is located on the surface of the display 340, and detects the touch of the user as an input. The touch panel 350 detects an input of text using a software keyboard, a selection input of image and others, an input of character and pictorial figure by handwriting, and others, for example. The character and the image input via the touch panel 350 are processed by the processor 310 as the annotation, and are transmitted via the communication section 330 to the server 200. The annotation can be related to a specific spatial position in the moving image, for example. In this case, the operation of the second user for specifying the position in the moving image to which the annotation is related may be accepted using the touch panel 350.

Note that, in the present embodiment, the moving image corresponding to the sight of the first user wearing the wearable display 100 is delivered to the tablet terminal 300, but in another embodiment, the moving image may be delivered to various types of devices including a display and an input device, such as a desktop or notebook personal computer, a television, a smartphone, a media player, a game machine, and the like, in addition to the tablet terminal 300, or instead of the tablet terminal 300. The moving image may be delivered to the wearable display that is different from the wearable display 100. In these cases, the input device is not limited to the touch panel illustrated in the present embodiment, but may be a keyboard, a mouse, a hardware button, or the like. Also, for the input of the annotation, audio input and gestural input may be utilized.

1-3. Functional Configuration

Figure 3:
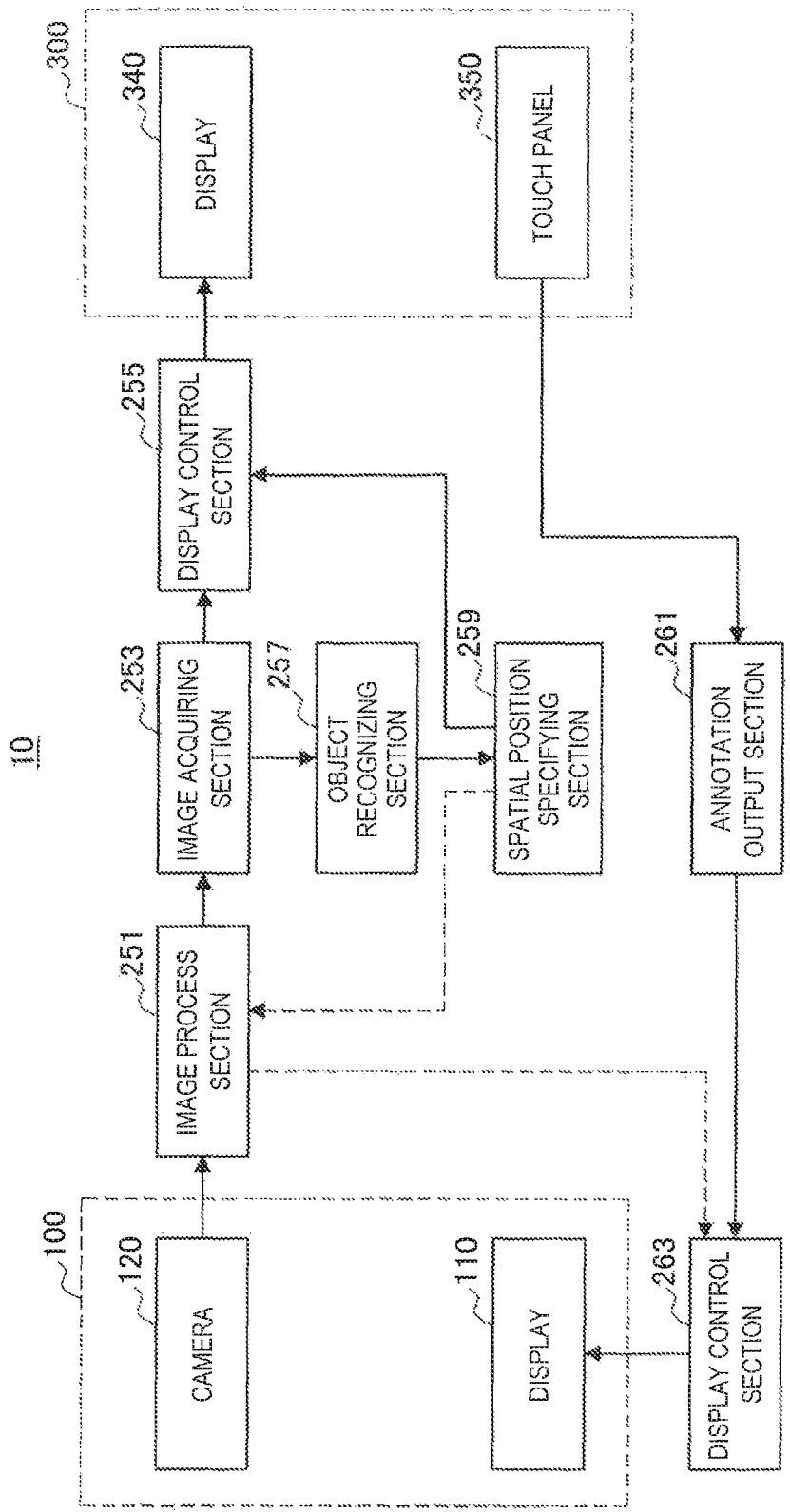
FIG. 3 is a diagram illustrating a schematic functional configuration of a system according to a first embodiment of the present disclosure.

FIG. 3 is a diagram illustrating a schematic functional configuration of the system according to the first embodiment of the present disclosure. Referring to FIG. 3, the system 10 includes an image process section 251, an image acquiring section 253, a display control section 255, an object recognizing section 257, a spatial position specifying section 259, an annotation output section 261, and a display control section 263, as a functional configuration. These functional configuration may be implemented by any of the processor 160 of the smartphone 150, the processor 210 of the server 200, or the processor 310 of the tablet terminal 300 for example, or may be implemented by these processors dispersedly. In the following, each functional configuration will be further described.

The image process section 251 processes the moving image shot by the camera 120 mounted on the wearable display 100, and generates the moving image corresponding to the sight of the first user wearing the wearable display 100. For example, the image process section 251 cuts out the region corresponding to the sight from the moving image shooting the wider scope than the sight of the first user, in response to the result of the calibration executed in advance. Also, for example, the image process section 251 may correct the inclination of the moving image on the basis of the difference in position between the camera 120 and the viewpoint of the first user.

The image acquiring section 253 acquires in real time, the moving image processed by the image process section 251, i.e., the moving image corresponding to the sight of the first user. Since the process in the image process section 251 does not change the viewpoint of the whole moving image, the moving image acquired by the image acquiring section 253 is also a moving image shot from the viewpoint changing from moment to moment. The display control section 255 displays the acquired moving image on the display 340 of the tablet terminal 300. The moving image displayed on the display 340 is displayed toward the second user that is different from the first user wearing the wearable display 100. Note that, as described later, the display control section 255 displays the spatial position in the first frame of the moving image specified by the spatial position specifying section 259, in such a manner to maintain the spatial position in a predetermined state in the second frame after the first frame.

The object recognizing section 257 recognizes the object included in the moving image acquired by the image acquiring section 253. Note that, since various technologies already known to the skilled person can be utilized for the recognition of the object included in the image, the detailed description will be omitted here. More specifically, the object recognizing section 257 recognizes one or a plurality of objects in the first frame of the moving image, and provides the spatial position information of the object to the spatial position specifying section 259.

The spatial position specifying section 259 specifies the spatial position in the first frame of the moving image. The first frame can be an arbitrary frame of the moving image. For example, in the present embodiment, the first frame may be the frame with which the object included in the moving image is recognized by the object recognizing section 257 for the first time. Here, the object recognizing section 257 can execute the object recognition continually during the delivery of the moving image. Therefore, the frame with which an object is recognized for the first time can be different among a plurality of objects included in the moving image. In this case, the frame interpreted as the first frame or the second frame is different for each recognized object.

In the present embodiment, the display control section 255 displays the spatial position in the first frame of the moving image specified by the spatial position specifying section 259, in such a manner to maintain the spatial position in a state marked as a candidate of the position to be related to the annotation in the second frame after the first frame. Here, as above, the spatial position specified by the spatial position specifying section 259 is the spatial position corresponding to the object recognized by the object recognizing section 257 in the first frame.

Accordingly, for example, in the moving image displayed on the display 340, in the frame (the second frame) same as or after the frame (the first frame) in which an object is recognized, the part (the first part) corresponding to the spatial position of this object is displayed in the state marked as a candidate of the position to be related to the annotation. When further another object is recognized in the subsequent frame, in the frame (the second frame for another object) same as or after the frame (the first frame for another object), the part (the second part) corresponding to the spatial position of the another object is displayed in the state marked as a candidate of the position to be related to the annotation, in addition to the above first part. For example, the display like this may be continued until each of the first part and the second part goes out of the frame of the moving image.

The annotation output section 261 outputs the annotation that the second user input via the touch panel 350 of the tablet terminal 300, in order to display the annotation in the sight of the first user. Here, the annotation may be related to a specific spatial position in the moving image. As above, in the moving image that the display control section 255 causes the display 340 to display, the spatial position corresponding to the object recognized by the object recognizing section 257 in the moving image is marked as a candidate of the position to be related to the annotation. Accordingly, for example, the second user can easily specify the position to be related to the annotation, by executing the operation to select any of the positions marked as a candidate via the touch panel 350. Note that, in the tablet terminal 300, the second user may be able to input the annotation without identifying a position in the moving image, or may be able to input the annotation in a related manner to a position other than the position marked as the candidate.

The display control section 263 displays the annotation output from the annotation output section 261, on the display 110 of the wearable display 100. Since the wearable display 100 is worn by the first user, the annotation displayed on the display 110 is displayed in the sight of the first user. Note that, when the display 110 is the closed type, the display control section 263 also displays the image acquired from the image process section 251 on the display 110.

By the functional configuration as above, for example, when the second user inputs the annotation at the tablet terminal 300, the position of the object included in the moving image is displayed as a candidate of the position to be related to the annotation, so that the position to be related to the annotation is specified easily. In many cases, since the object exists at the position in the moving image which the second user want to relate the annotation, an appropriate candidate of the position is provided by the configuration as above.

As above, in the image shot by the camera 120 mounted on the wearable display 100, as the viewpoint changes from moment to moment, the scope of the real space included in the image and the angle of the image in relation to the real space change as well. Accordingly, without any assistance, pointing a desired spatial position accurately is not easy. In the present embodiment, the spatial position corresponding to the object in the moving image is displayed as a candidate of the pointing, so that the second user points a desired spatial position accurately, and the annotation is displayed toward the first user at an intended position.

1-4. Exemplary Display

Exemplary Display in Wearable Display

Figure 4:
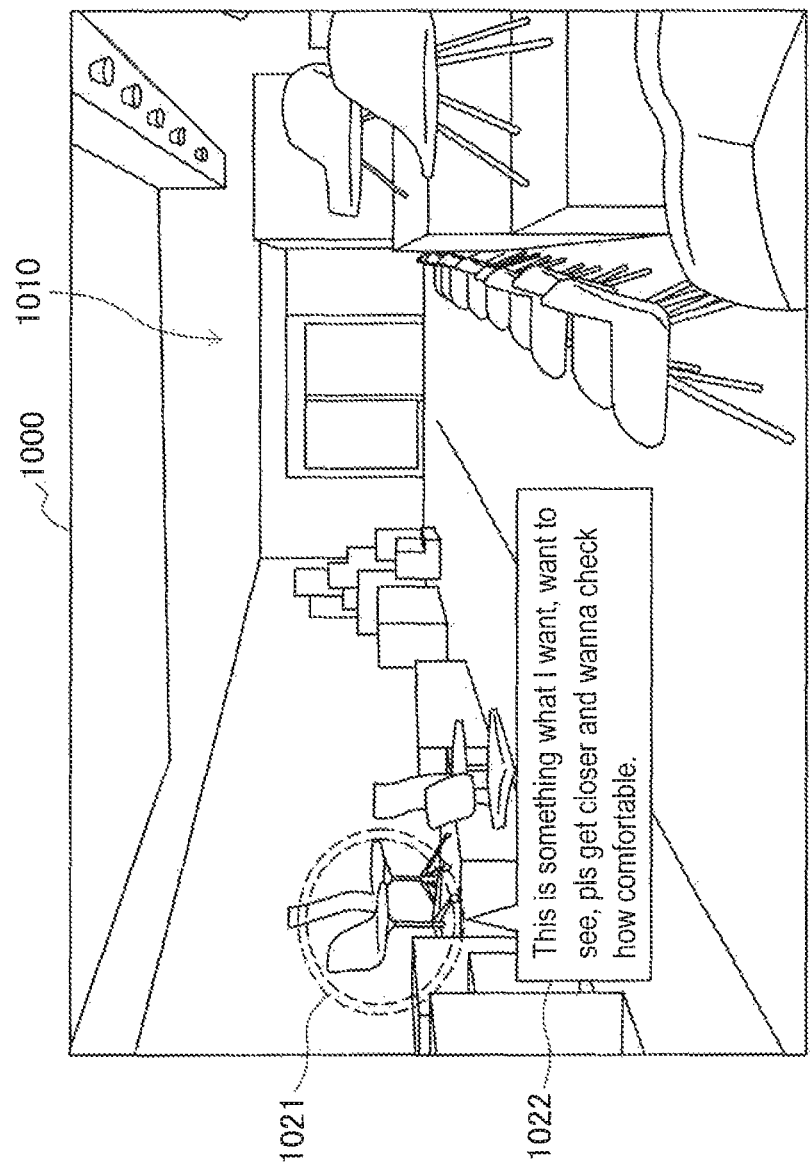
FIG. 4 is a diagram illustrating an exemplary display in a wearable display in a first embodiment of the present disclosure.

FIG. 4 is a diagram illustrating an exemplary display on the wearable display in the first embodiment of the present disclosure. Referring to FIG. 4, a real space picture 1010, a marker 1021, and an annotation 1022 are displayed in the screen image 1000 displayed on the display 110 of the wearable display.

As described above, the real space picture 1010 may be viewed directly through the transparent display 110, or may be the image electronically displayed on the display 110 of the closed type. In either case, the real space picture 1010 is the image corresponding to the sight of the first user wearing the wearable display 100.

The marker 1021 represents the spatial position related to the annotation 1022 that the second user inputs at the tablet terminal 300 to which the image based on the moving image shot by the camera 120 of the wearable display 100 is delivered. As described later, in the present embodiment, the spatial position related to the annotation 1022 can be the position corresponding to a specific object, but it may not particularly shown in the display of the marker 1021 and the annotation 1022. Alternatively, to make the first user to recognize the object that the second user pays attention to, the marker 1021 may be displayed in a form more related to the object. For example, in the example illustrated in the drawing, the marker 1021 may be displayed in the form of a chair which is the object put there.

Note that, in the example illustrated in the drawing, although only a pair of the marker 1021 and the annotation 1022 is displayed, when the moving image is delivered to a plurality of tablet terminals 300 for example, the annotations 1022 each input by a plurality of second users and the markers 1021 corresponding to the annotations 1022 may be displayed side by side. Also, when the single second user inputs a plurality of annotations consecutively, a plurality of pairs of the marker 1021 and the annotation 1022 are displayed side by side.

(Exemplary Display in Tablet Terminal)

Figure 5:
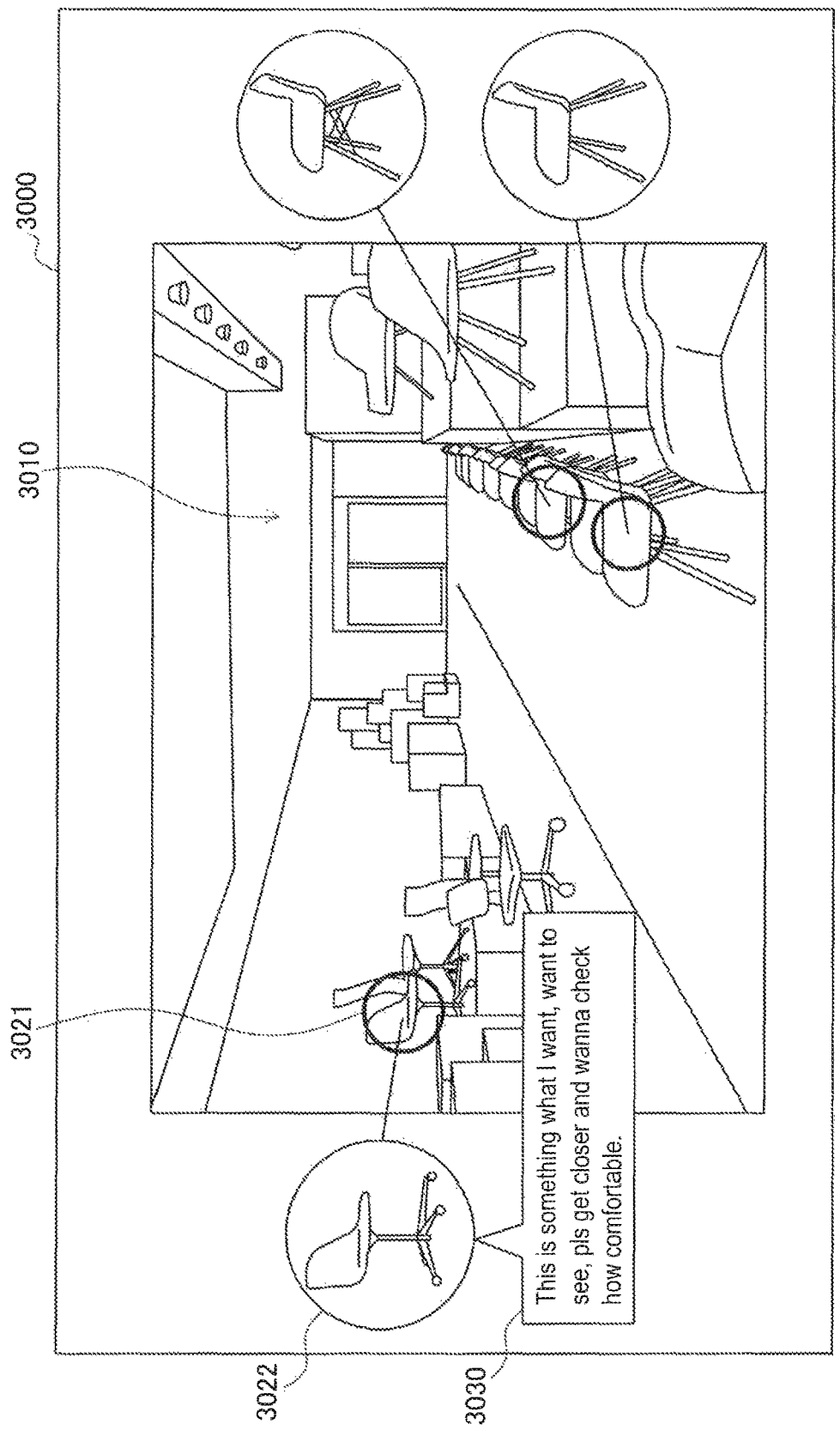
FIG. 5 is a diagram illustrating an exemplary display in a tablet terminal in a first embodiment of the present disclosure.

FIG. 5 is a diagram illustrating an exemplary display in the tablet terminal in the first embodiment of the present disclosure. Referring to FIG. 5, in the screen image 3000 displayed on the display 340 of the tablet terminal 300, a moving image 3010, a marker 3021, an object image 3022, and an annotation 3030 are displayed.

The moving image 3010 is the image corresponding to the sight of the first user, which is generated by processing the moving image shot by the camera 120 mounted on the wearable display 100. The moving image 3010 is displayed in real time, except for the time lag due to the communication delay and the like. That is, the moving image 3010 almost synchronizes with the real space picture 1010 displayed at the wearable display 100.

In the moving image 3010, the marker 3021 is displayed at the spatial position corresponding to the object recognized by the object recognizing section 257. In the example illustrated in the drawing, three objects (each is a chair) are recognized, and three markers 3021 corresponding to the objects are displayed. Even when the view angle of the moving image 3010 is changed in the subsequent frame, the markers 3021 are displayed at the spatial positions corresponding to the respective objects continuously. Accordingly, the markers 3021 are displayed while changing the positions in the moving image 3010.

As described above, the display of the markers 3021 like this is achieved by the spatial position specifying section 259 that specifies the spatial position corresponding to the object recognized by the object recognizing section 257, and the display control section 255 that displays the specified spatial position, while maintaining the specified spatial position in a state marked as a candidate of the position to be related to the annotation. The user can easily specify the spatial position to be related to the annotation, by selecting any of the spatial positions presented by the marker 3021.

The object image 3022 is displayed to be related to the marker 3021. Since the marker 3021 corresponds to the spatial position of the object, the object image 3022 is indirectly related to the spatial position of the object.

For example, the object image 3022 can be a catalog image of the object acquired from the database and the like on the network on the basis of the result of the object recognition. In this case, the object image 3022 is displayed, so that the object facing laterally or obliquely or displayed to hide behind another object at front is recognized by the easily viewable image. The catalog image is an example of the related information of the object. In another embodiment, in addition to or instead of the catalog image, other related information such as the name and the specifications of the object may be displayed in such a manner directly or indirectly related to the spatial position of the object.

Alternatively, the object image 3022 may be the image simply cutting out the image of the corresponding space region, or the enlarged image of this. In this case as well, the object is cut out from the moving image and is displayed in another box, so that the second user easily recognizes what the target object is.

The annotation 3030 is the text or the pictorial figure that the second user inputs via the touch panel 350 of the tablet terminal 300. In the example illustrated in the drawing, the annotation 3030 mainly made up by the text is illustrated, but in another example, the annotation 3030 may be made up including a pictorial figure representing the feeling and the like of the second user for example, or may be made up by the pictorial figure only. Also, the pictorial figure of handwriting input via the touch panel 350 may be treated as the annotation 3030.

Here, when specifying the spatial position to be related to the annotation, the user may select the marker 3021 via the touch panel 350 for example, or may select the object image 3022 as in the example illustrated in the drawing. Since the object image 3022 is related to the spatial position of the marker 3021, the selection of the object image 3022 can be equated with the selection of the spatial position corresponding to the marker 3021. For example, when a plurality of objects closely spaced are included in the moving image 3010, specifying the spatial position to be related to the annotation by selecting the object image 3022 in another box not including the moving image 3010 is useful.

1-5. Variant Example

First Variant Example

Figure 6:
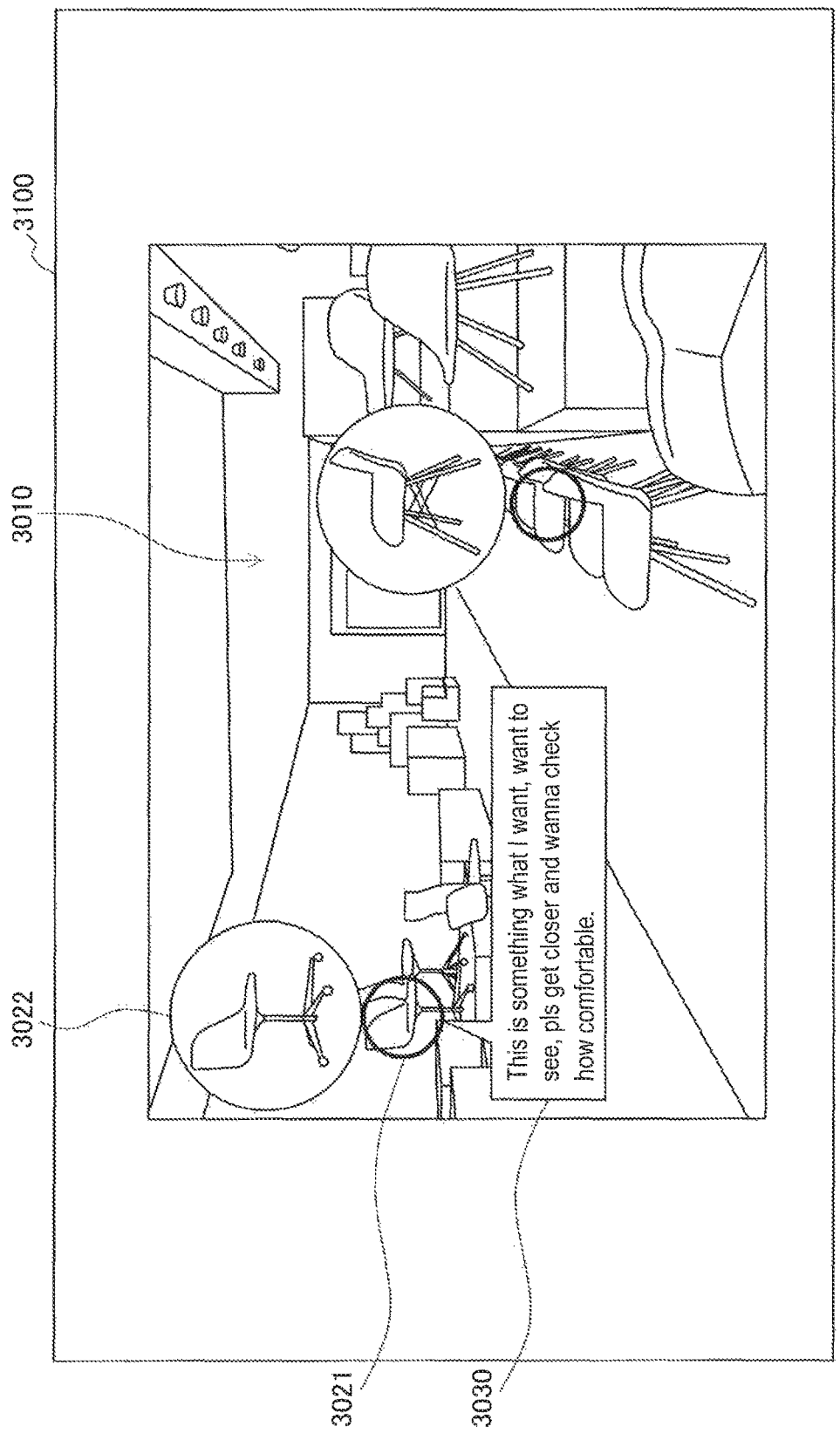
FIG. 6 is a diagram illustrating an exemplary display in a tablet terminal in a first variant example of a first embodiment of the present disclosure.

FIG. 6 is a diagram illustrating an exemplary display in the tablet terminal in the first variant example of the first embodiment of the present disclosure. Referring to FIG. 6, in the present variant example, in contrast to the example illustrated in FIG. 5, the object image 3022 and the annotation 3030 are displayed inside the moving image 3010 in the screen image 3100 displayed on the display 340 of the tablet terminal 300. For example, when the spatial density of the objects recognized in the moving image 3010 is low, or when the spatial position of the recognized object is away from the edge of the moving image 3010, the display form like the example illustrated in the drawing may be employed.

Also, the example of FIG. 5 and the example of FIG. 6 may be combined, so that the object image 3022 of the first object among the objects recognized in the moving image 3010 is displayed outside the moving image 3010 (the example of FIG. 5), and the object image 3022 of the second object is displayed inside the moving image 3010 (the example of FIG. 6).

Second Variant Example

Figure 7:
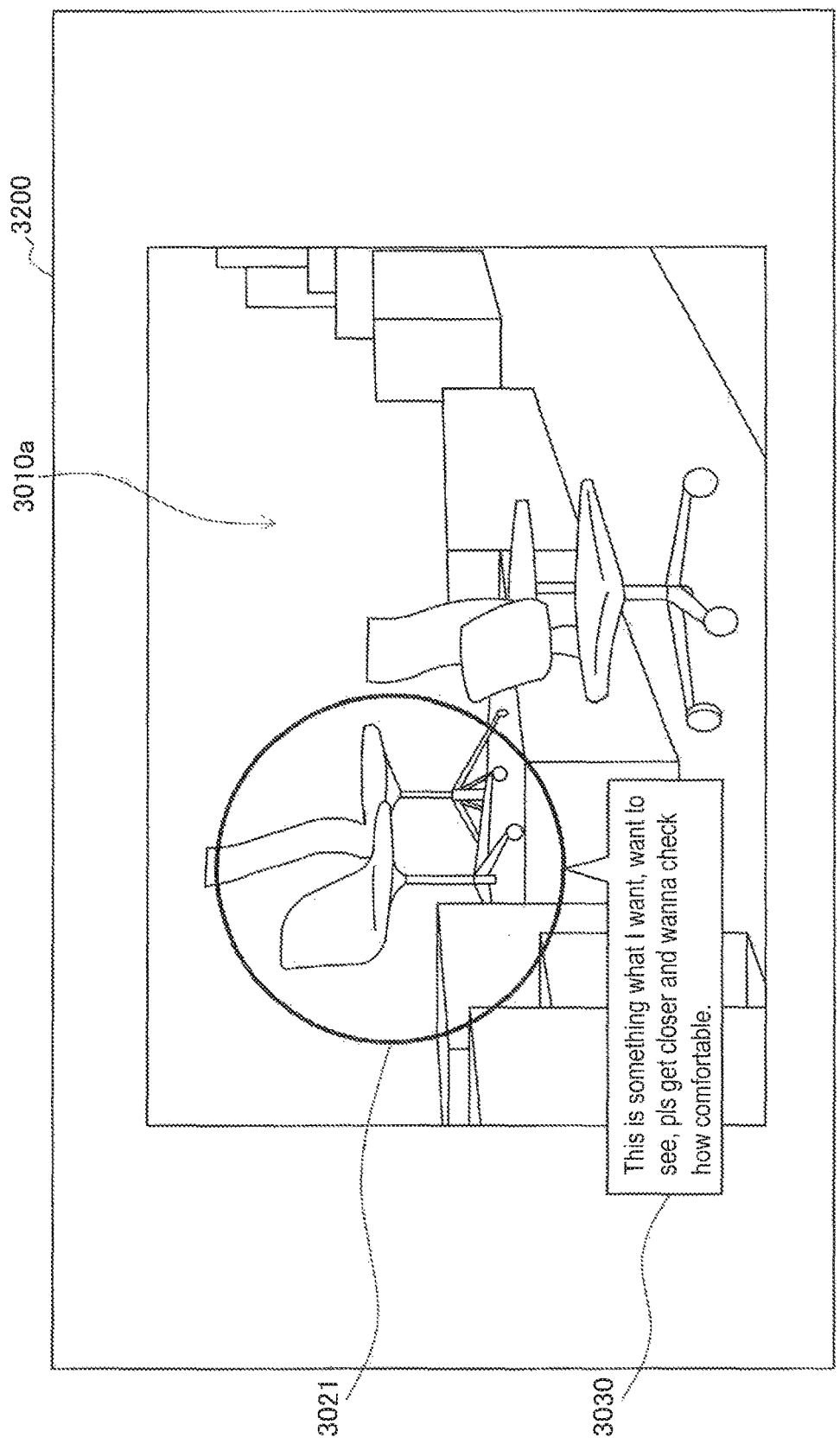
FIG. 7 is a diagram illustrating an exemplary display in a tablet terminal in a second variant example of a first embodiment of the present disclosure.
Figure 8:
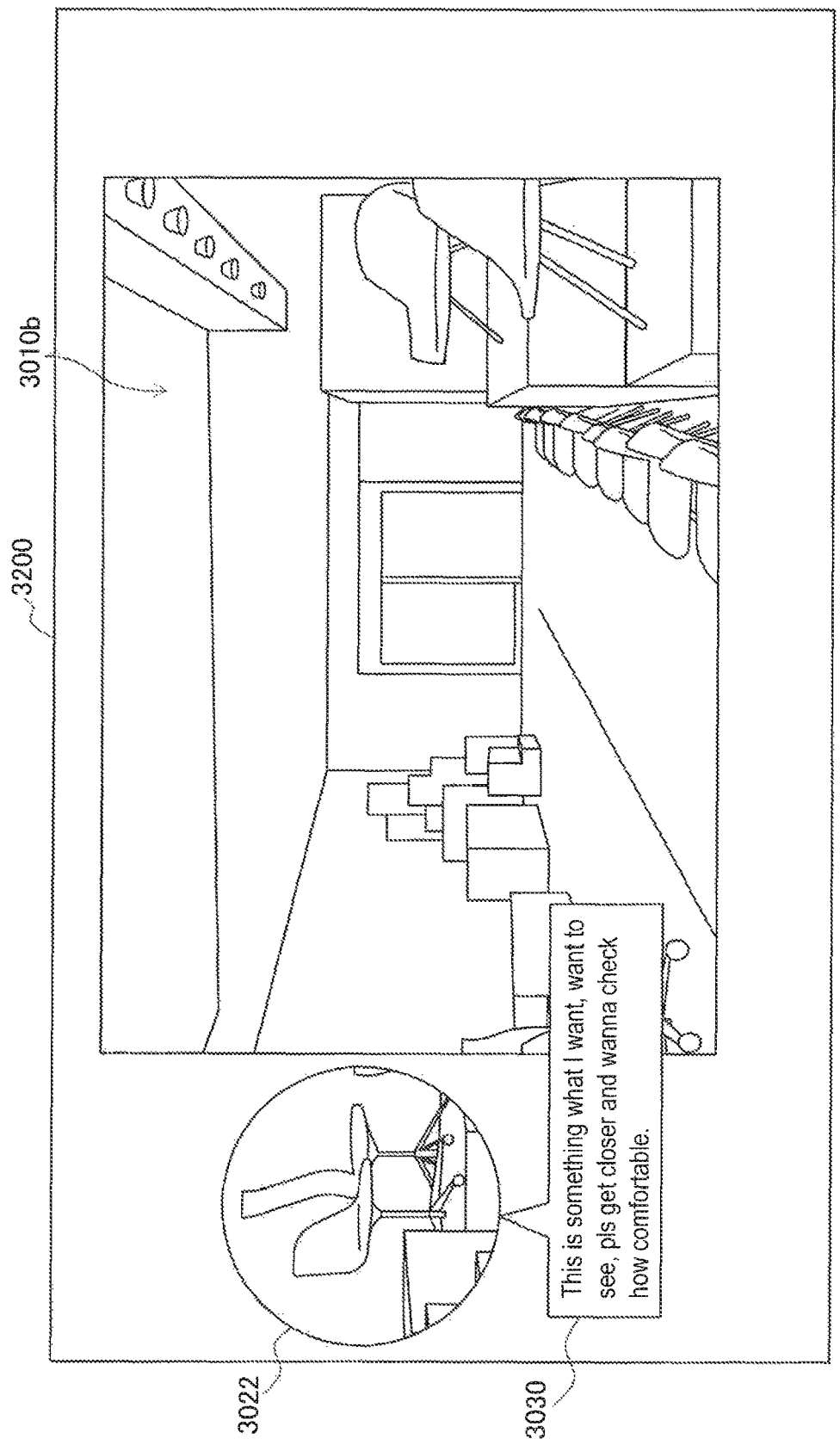
FIG. 8 is a diagram illustrating an exemplary display in a tablet terminal in a second variant example of a first embodiment of the present disclosure.

FIG. 7 and FIG. 8 are diagrams illustrating exemplary displays in the tablet terminal in the second variant example of the first embodiment of the present disclosure. Referring to FIG. 7, in the present variant example, in contrast to the example illustrated in FIG. 5 and FIG. 6, in the screen image 3200 displayed on the display 340 of the tablet terminal 300, the marker 3021 is displayed to circle the target object (a chair in the example illustrated in the drawing), and the other object image 3022 is not displayed. The annotation 3030 is input to be related to the marker 3021. When displaying the information relevant to the object inside the moving image 3010 in the same way as the above first variant example does not impair the viewability of the information, and the object is displayed sufficiently large, the display form like the example illustrated in the drawing may be employed.

FIG. 8 is an example of the case where the first frame 3010a of the moving image 3010 in the example of FIG. 7 changes into the second frame 3010b as time passes. The second frame 3010b displayed in the screen image 3200 does not include the spatial position of the object (the chair) for which the marker 3021 is displayed in the first frame 3010a. Therefore, in the screen image 3200, the object image 3022 is displayed outside the second frame 3010b instead of the marker 3021.

That is, the display control section 255 provides another box which is the object image 3022, for the second frame 3010b that does not include the specified spatial position any more, to maintain the above spatial position in a displayed state. In this way, the display of the spatial position specified in the first frame 3010a is maintained in the second frame 3010b as well, so that the annotation 3030 is continuously displayed by changing the related target from the marker 3021 to the object image 3022.

Note that the display on the wearable display 100 side in the example of above FIG. 8 can be considered separately. For example, the display control section 263 may display the object image 3022 displayed in the above screen image 3200, in such a manner to superimpose the object image 3022 not on the outside of the real space picture (outside the sight of the first user), but on the inside of the real space picture.

Here, the process for displaying the image as in the example of above FIG. 8 will be further described. As described above, the moving image 3010 is generated by the image process section 251 cutting out the region corresponding to the sight of the first user wearing the wearable display 100, from the moving image (hereinafter, also referred to as the source moving image) shot by the camera 120 mounted on the wearable display 100.

In many cases, since the scope shot in the source moving image is wider than the sight of the first user, the image process section 251 cuts out the surrounding region of the source image. Therefore, even when the spatial position specified in the first frame 3010a is not included in the second frame 3010b of the moving image 3010 after the process, it is possible that the source moving image includes this spatial position. For a case like that, the spatial position specifying section 259 may provide the information of the specified spatial position to the image process section 251 as well. In this case, when the specified spatial position goes out of the frame of the moving image after the process, the image process section 251 provides the frame of the moving image generated by cutting out the surrounding region of the source moving image, and the image of the above spatial position cut out from the surrounding region of the source moving image, to the image acquiring section 253.

Alternatively, in the second frame 3010b, the display control section 255 may realize a display like the example illustrated in FIG. 8, by displaying the image (the object image 3022) in another box, using the image cut out from the frame (which may be the first frame 3010a, for example) including the spatial position specified at or before the second frame 3010b. For example, because of the configuration of the system 10, the configuration like this is effective, when the image process section 251 has a difficulty in functioning on the basis of the information provided from the spatial position specifying section 259, or when the specified spatial position is not included any more in the surrounding region of the source moving image.

Note that, in the present embodiment, to display the spatial position in the moving image specified by the spatial position specifying section 259 in such a manner to maintain the spatial position in a predetermined state, the display control section 255 may utilize the result of the object tracking that the object recognizing section 257 executes at or after the first frame, for example.

Also, in the present embodiment, the image process section 251 or the display control section 255 may identify the relative position and orientation of the coordinate system of the reference environment (the real space) in relation to the coordinate system of the wearable display 100, on the basis of the environment recognition matrix recognized by publicly known image recognition technologies such as the structure from motion (SfM) method and the simultaneous localization and mapping (SLAM) method. Thereby, the image process section 251 or the display control section 255 can fix the position specified by the spatial position specifying section 259 in the space coordinate system.

More specifically, when the SLAM method is utilized for example, the state variables including the position, the orientation, the velocity and the angular velocity of the device as well as the position of at least one feature point included in the shot image are renewed for each frame of the shot image on the basis of the principle of the extended Kalman filter. Thereby, the position and the orientation of the reference environment with reference to the position and the orientation of the wearable display 100 are recognized utilizing the input image of from the camera 120. Note that the detailed description of the SLAM method is made in "Real-Time Simultaneous Localization and Mapping with a Single Camera" (Andrew J. Davison, Proceedings of the 9th IEEE International Conference on Computer Vision Volume 2, 2003, pp. 1403-1410), for example.

2. Second Embodiment

Next, the second embodiment of the present disclosure will be described. Note that, with regard to the same configuration (system configuration, device configuration and the like) as the above first embodiment, duplicative description will be omitted.

Figure 9:
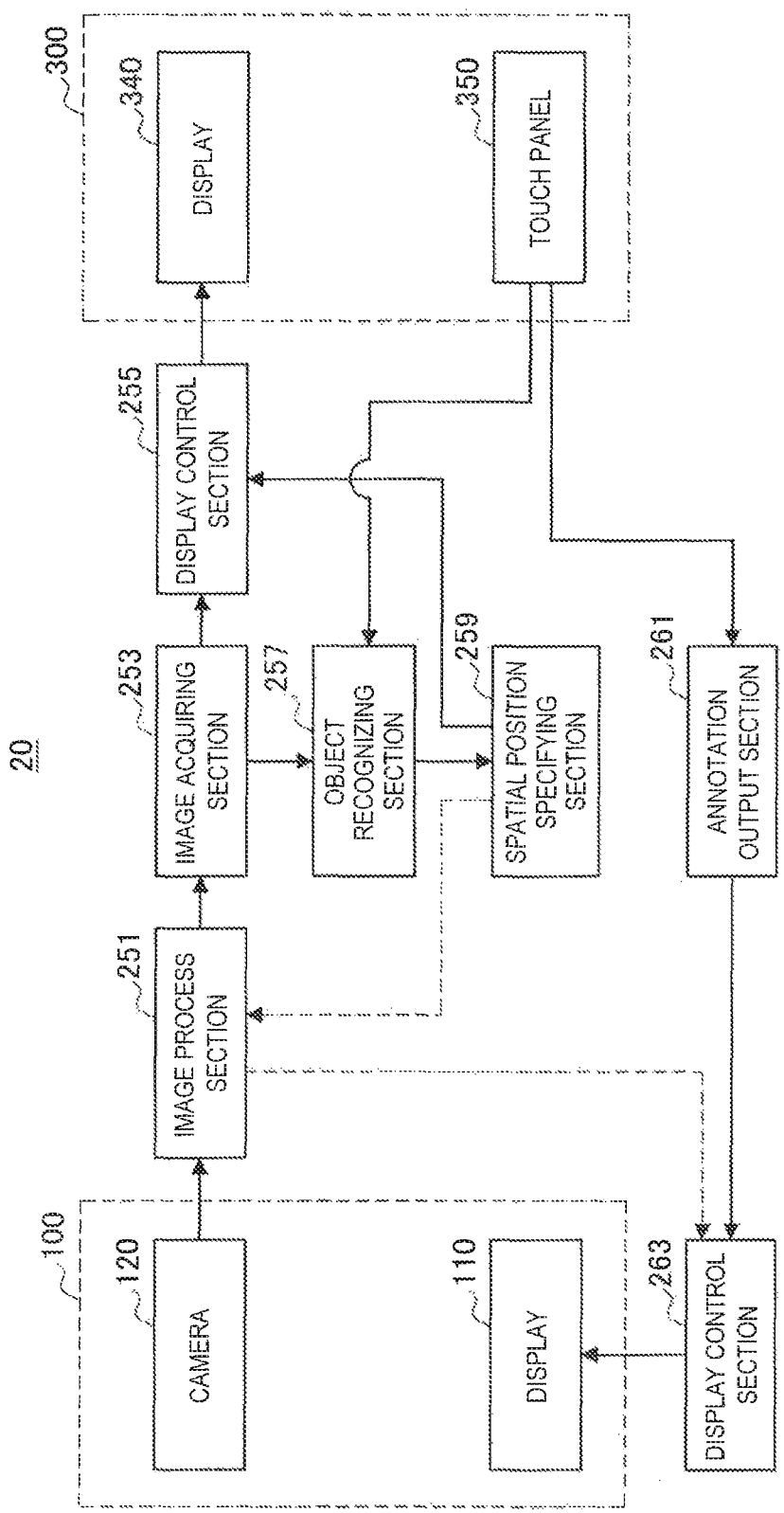
FIG. 9 is a diagram illustrating a schematic functional configuration of a system according to a second embodiment of the present disclosure.

FIG. 9 is a diagram illustrating a schematic functional configuration of the system according to the second embodiment of the present disclosure. Referring to FIG. 9, the system 20 includes the same functional configuration as the system 10 described above with reference to FIG. 3. Note that, in the present embodiment, the object recognizing section 257 recognizes the object included in the moving image, at the spatial position that the second user specifies via the touch panel 350 of the tablet terminal 300 or near the same spatial position.

That is, in the present embodiment, the recognition of the object by the object recognizing section 257 is executed only at or near the spatial position specified by the second user. Depending on the image quality of the moving image that the image acquiring section 253 acquires, the performance of the object recognition in the object recognizing section 257, and the number of the objects actually included in the moving image, etc, it is sometimes difficult to display the marker 3021 and the object image 3022 on the display 340 for all the recognized objects, and it is sometimes difficult, though possible, to view the display, and it is sometimes difficult to specify the spatial position because of the too many markers 3021. In that case, as in the present embodiment, limiting the scope that the object recognition is executed is effective.

As the variant example of the present embodiment, for example, the scope within which the object recognition is executed by the object recognizing section 257 may be set on the basis of the gazing scope of the first user wearing the wearable display 100. For example, it may be such that the wearable display 100 further includes an eye camera, and the process to estimate the gazing scope of the first user is executed with the processor of any of the devices on the basis of the image shot by the eye camera. In this case, the object recognizing section 257 executes the object recognition in the region corresponding to the gazing scope of the first user. Accordingly, the marker 3021 displayed to the second user as a candidate of the spatial position to be related to the annotation is displayed with regard only to the region corresponding to the current gazing scope of the first user. Thereby, for example, the spatial position of high probability of being gazed by the first user is presented to the second user as a candidate of the spatial position to be related to the annotation.

3. Third Embodiment

Next, the third embodiment of the present disclosure will be described. Note that, with regard to the same configuration (system configuration, device 26 configuration, and the like) as the above first and second embodiments, duplicative description will be omitted.

3-1. Functional Configuration

Figure 10:
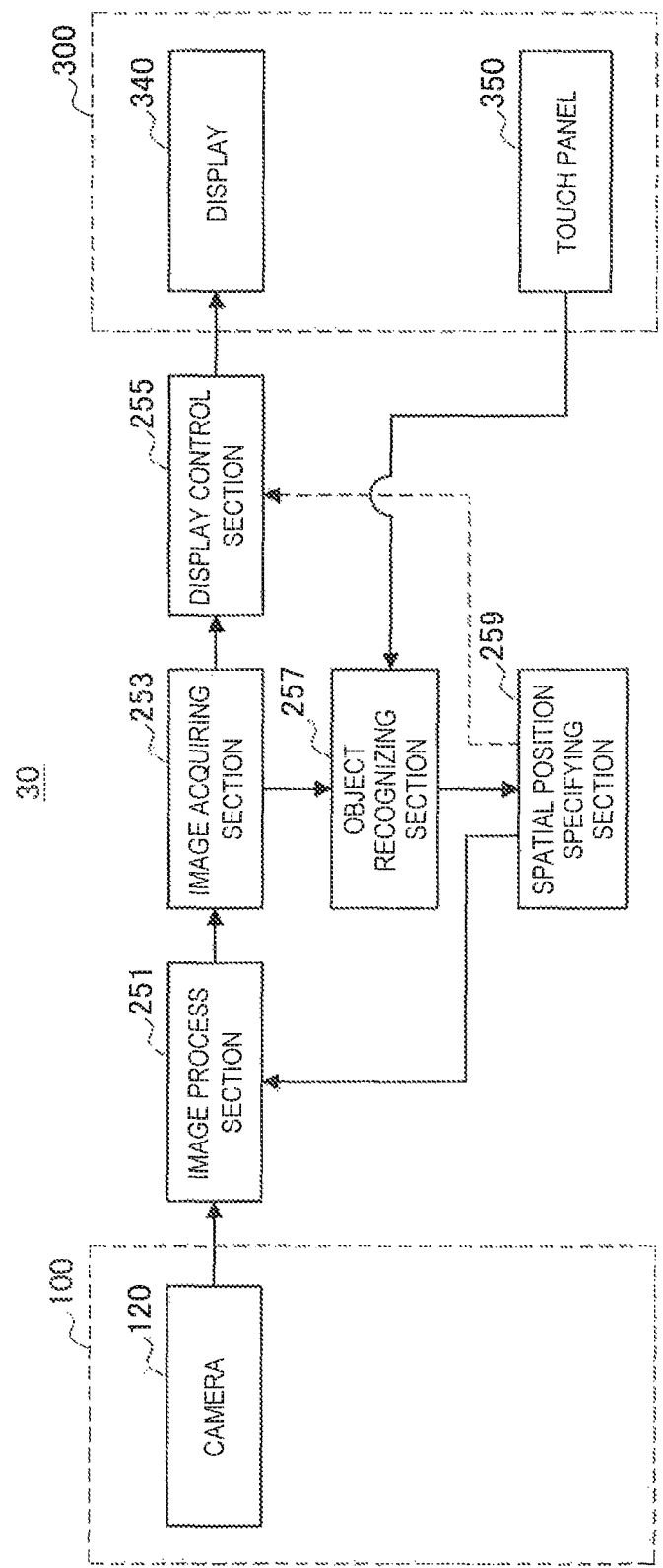
FIG. 10 is a diagram illustrating a schematic functional configuration of a system according to a third embodiment of the present disclosure.

FIG. 10 is a diagram illustrating a schematic functional configuration of the system according to the third embodiment of the present disclosure. Referring to FIG. 10, the system 30 includes an image process section 251, an image acquiring section 253, a display control section 255, an object recognizing section 257, and a spatial position specifying section 259, as a functional configuration. In the present embodiment, in contrast to the above first and second embodiments, the annotation may not be necessarily input by the second user who uses the tablet terminal 300. As a matter of course, the configuration for the second user to input the annotation at the tablet terminal 300 may be employed additionally, by combining the present embodiment and the above first or second embodiment. In the following, with regard to the above functional configuration, the points different from the first and second embodiments are described mainly.

The image process section 251 processes the moving image shot by the camera 120 mounted on the wearable display 100, and generates the moving image corresponding to the sight of the first user wearing the wearable display 100. At this time, the image process section 251 may generate the above moving image in which the image of the region corresponding to the spatial position specified by the spatial position specifying section 259, is in a state larger than other regions. Also, the image process section 251 may generate the above moving image in which the image of the region corresponding to the specified spatial position is maintained at the resolution higher than other regions.

Here, the information of the spatial position specified by the spatial position specifying section 259 is provided to the image process section 251, so that the information, which would be lost in other regions, is retained at the time of the image process in the region corresponding to the specified spatial position. For example, for the reason that the utilizable band in the network for transferring the moving image between the devices is limited or the like reason, the image process section 251 sometimes downsizes the source moving image, or cuts down the data amount of the moving image after process by reducing the resolution of the source moving image. In this case, the information of the spatial position specified by the spatial position specifying section 259 is provided to the image process section 251, so that for example the image in which the region is enlarged and the image in which the region has a high resolution are transmitted separately (by another stream), and the display control section 255 displays these images on the display 340 of the tablet terminal 300.

The display control section 255 displays the moving image acquired by the image acquiring section 253, on the display 340 of the tablet terminal 300. As above, when the image process section 251 processes the source moving image in such a manner that the image of the region corresponding to the spatial position specified by the spatial position specifying section 259 is maintained in a predetermined state, the display control section 255 displays the moving image in such a manner to maintain the specified spatial position in a predetermined state, without performing any process on the moving image.

On the other hand, when the image process section 251 does not acquire the information of the specified spatial position, and the moving image generated by processing the image of the region other than the image of the region corresponding to the specified spatial position in the same way is acquired by the image acquiring section 253, the display control section 255 processes the moving image in such a manner that the specified spatial position is maintained in a predetermined state. For example, the display control section 255 may process the image of the region corresponding to the specified spatial position in a state larger than other regions, and then display the moving image. Also, for example, the display control section 255 may up-convert the image of the region corresponding to the specified spatial position, to a resolution higher than other regions, and then display the moving image.

The object recognizing section 257 executes the object recognition at or near the spatial position specified by the second user. In the present embodiment, the second user can specify the spatial position wished to be browsed continually in a predetermined state. Accordingly, the object recognizing section 257 recognizes the object existing at the spatial position, and allows the spatial position specifying section 259 to specify the spatial position with reference to the object. Therefore, when a plurality of the objects are recognized at or near the spatial position specified by the second user, the object recognizing section 257 may output an inquiry as to which spatial position corresponding to the object to specify, via the display control section 255 and the display 340 toward the second user.

3-2. Exemplary Display

First Exemplary Display

Figure 11:
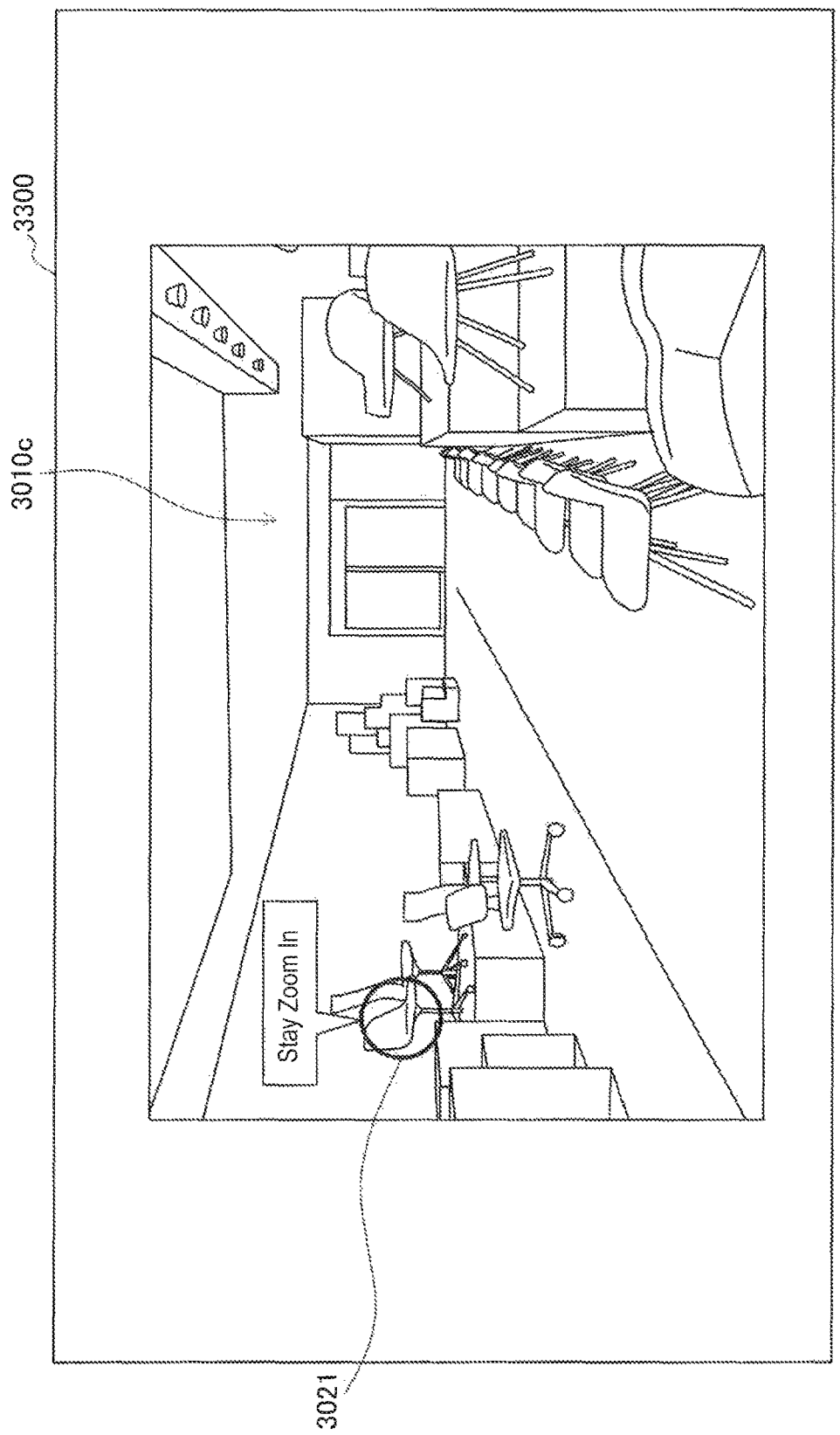
FIG. 11 is a diagram illustrating a first exemplary display in a third embodiment of the present disclosure.
Figure 12:
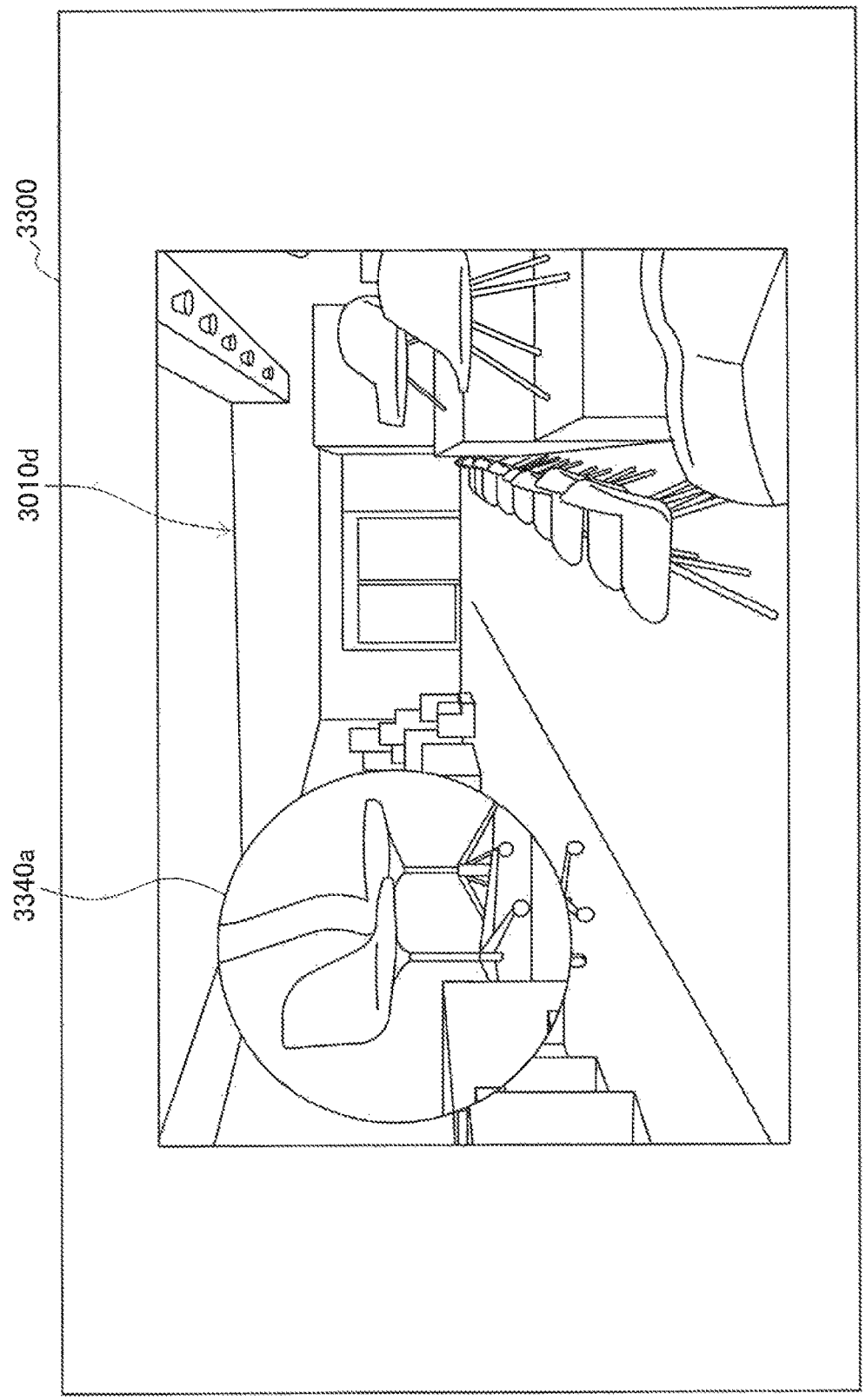
FIG. 12 is a diagram illustrating a first exemplary display in a third embodiment of the present disclosure.
Figure 13:
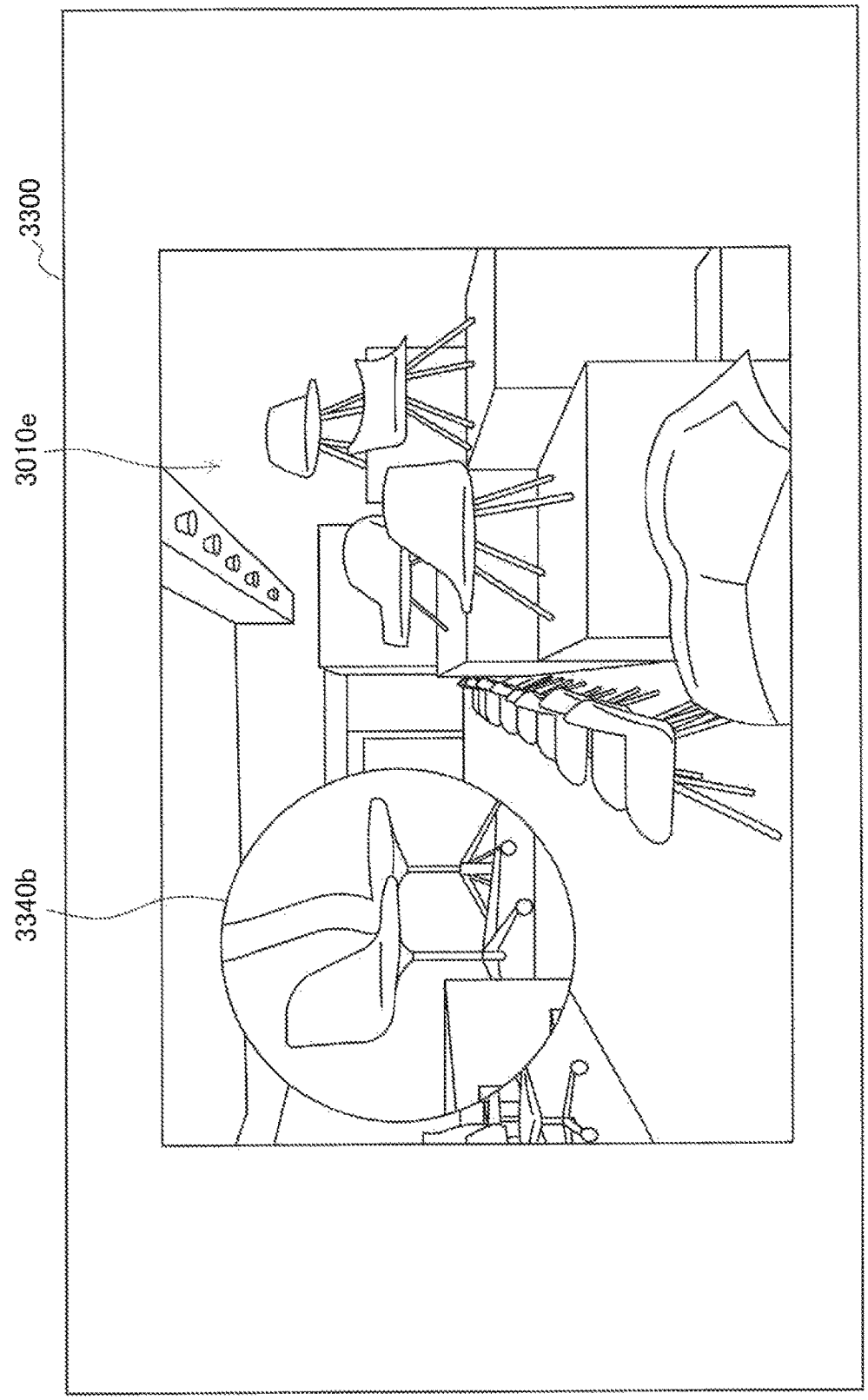
FIG. 13 is a diagram illustrating a first exemplary display in a third embodiment of the present disclosure.

FIG. 11 to FIG. 13 are diagrams illustrating the first exemplary display in the third embodiment of the present disclosure. First, referring to FIG. 11, in the screen image 3300 displayed on the display 340 of the tablet terminal 300, the moving image 3010 (the frame 3010c) and the marker 3021 are displayed.

For example, in the moving image 3010, the marker 3021 is displayed in the region corresponding to the object that the object recognizing section 257 recognizes at or near the spatial position that the second user using the tablet terminal 300 specifies via the touch panel 350 and the like. In the example illustrated in the drawing, where the user wishes to enlarge and display the image of the specified spatial position, the marker 3021 is displayed, so that the user can recognize whether or not the intended spatial position is displayed in an enlarged manner.

Next, referring to FIG. 12, the moving image 3010 (the frame 3010d) and the enlarged image 3340a are displayed in the screen image 3300. Further, referring to FIG. 13, the moving image 3010 (the frame 3010e) and the enlarged image 3340b are displayed in the screen image 3300.

The enlarged image 3340 is the image in which the image of the region corresponding to the spatial position (which corresponds to the spatial position of the recognized object (the chair)) that the user specifies in the frame 3010c illustrated in FIG. 11 above is displayed larger than other regions. The enlarged image 3340a displayed in the frame 3010d and the enlarged image 3340b displayed in the frame 3010e are each the image in which the region corresponding to the spatial position of the object (the chair) in the respective frames is enlarged (i.e., not a captured image).

In the present exemplary display, the view angle of the moving image 3010 changes between the frame 3010d and the frame 3010e, but the spatial position displayed as the enlarged image 3340 does not change. That is, in the present exemplary display, the region in which the enlarged image 3340 is displayed is anchored to the specified spatial position. Accordingly, even if the view angle of the moving image 3010 changes for the reason that the first user wearing the wearable display 100 moves or the like reason, the region corresponding to the spatial position that the second user specifies for the first time (in the frame 3010c) is displayed as the enlarged image 3340.

Second Exemplary Display

Figure 14:
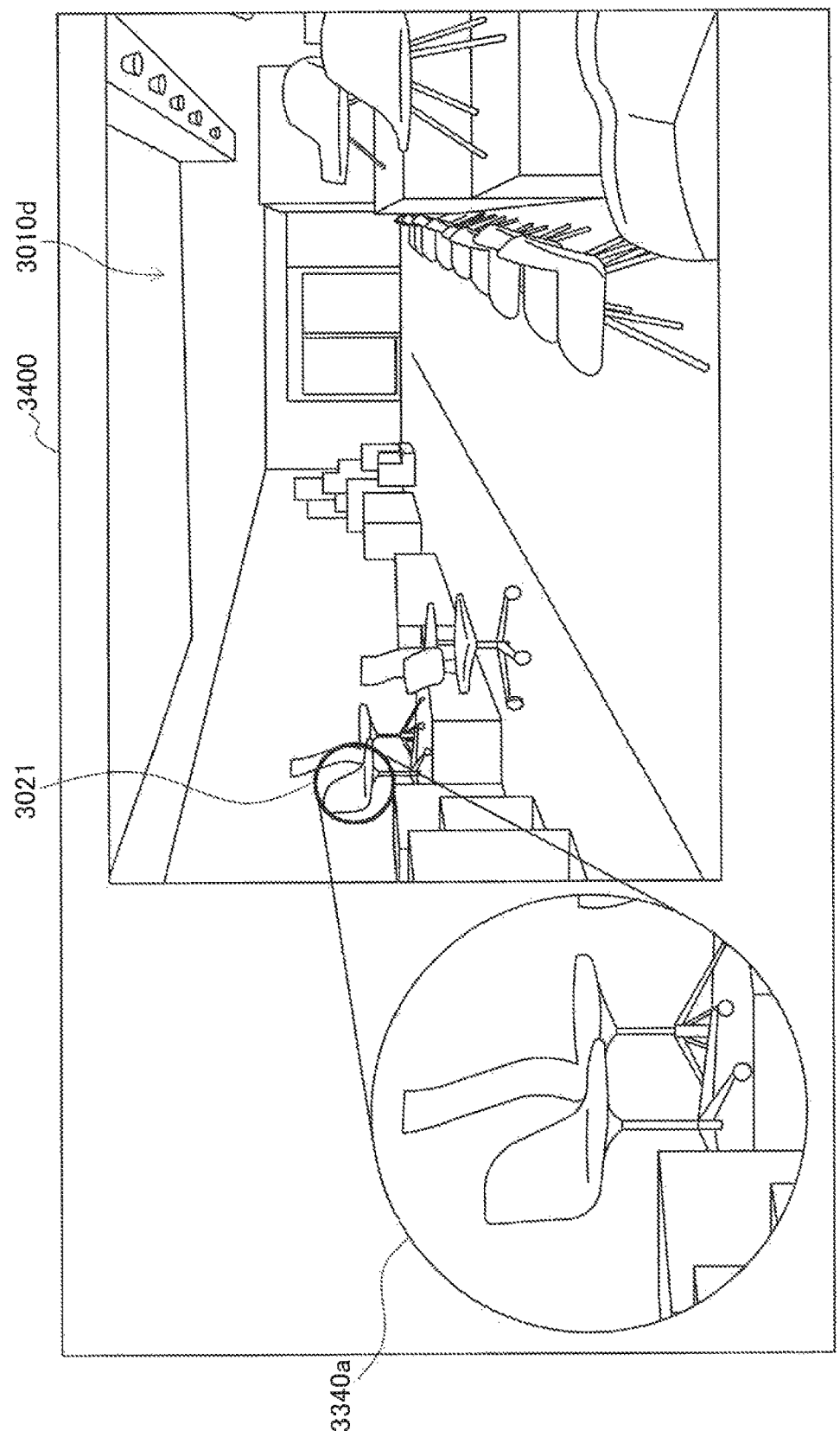
FIG. 14 is a diagram illustrating a second exemplary display in a third embodiment of the present disclosure.
Figure 15:
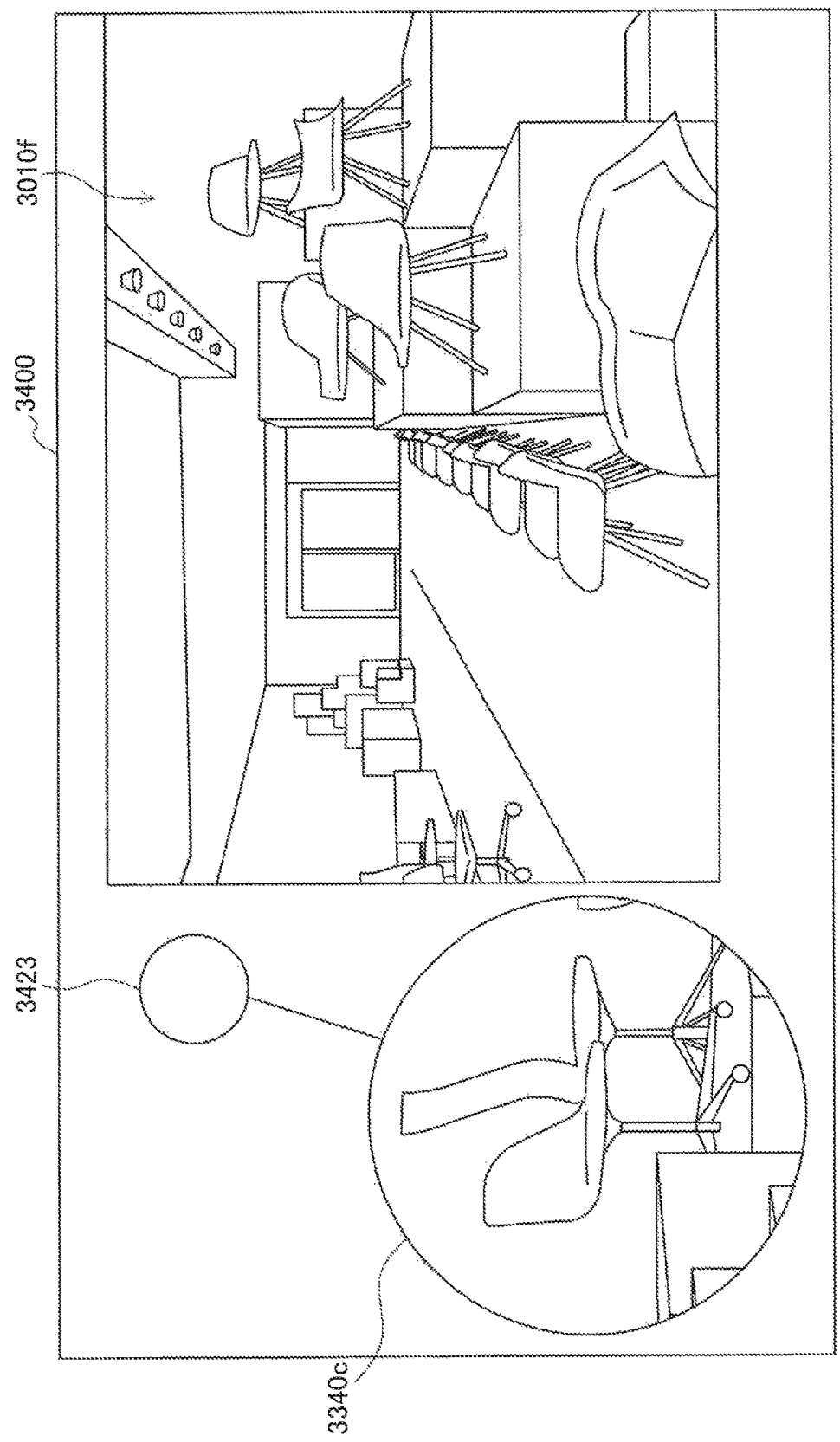
FIG. 15 is a diagram illustrating a second exemplary display in a third embodiment of the present disclosure.

FIG. 14 and FIG. 15 are diagrams illustrating the second exemplary display in the third embodiment of the present disclosure. First, referring to FIG. 14, the same state as FIG. 12 in the above second exemplary display is illustrated. That is, in the screen image 3400, the enlarged image 3340a is displayed in the frame (the frame 3010c) before the frame 3010d illustrated in the drawing, with regard to the region corresponding to the object that the object recognizing section 257 recognizes at or near the spatial position that the second user who uses the tablet terminal 300 specifies via the touch panel 350 and the like. As the difference from the first exemplary display, the enlarged image 3340a is displayed outside the moving image 3010 in the present exemplary display. In this case, the marker 3021 is also continuously displayed in addition to the enlarged image 3340a. In this way, the enlarged image 3340 in the present embodiment may be displayed inside the moving image 3010, or outside the moving image 3010.

Next, referring to FIG. 15, in the screen image 3400, the moving image 3010 (the frame 3010f), the enlarged image 3340c, and the blank marker 3423 are displayed. In this state, by the change of the view angle of the moving image 3010, the frame 3010f does not include the spatial position of the object (the chair), which has been included in the frame 3010d. Therefore, in the screen image 3400, the blank marker 3423 is displayed outside the frame 3010f. Alternatively, in the screen image 3400, the object image 3022 may be displayed, in the same way as the example described with reference to FIG. 8 in the above first embodiment.

Further, in the screen image 3400, the enlarged image 3340c of the spatial position, which is not included in the frame 3010f, is displayed. For example, when the spatial position is not included in the frame 3010f, but included in the source moving image (the moving image shot by the camera 120 mounted on the wearable display 100), the spatial position specifying section 259 provides the information of the spatial position to the image process section 251, and the image process section 251 cuts out the image of the region corresponding to the spatial position from the source moving image and provides the cutout image to the image acquiring section 253, and thereby it becomes possible that the display control section 255 displays the enlarged image 3340c.

Alternatively, the display control section 255 may display the enlarged image 3340c, using the image cut out from the frame (which may be the frame 3010d, for example) including the spatial position specified at or before the frame 3010f. In this case, although the enlarged image 3340c is a temporarily captured image, when the specified spatial position becomes included in the moving image 3010 or the source moving image, the enlarged image 3340 can be displayed on the basis of the frame that is streamed again.

Third Exemplary Display

Figure 16:
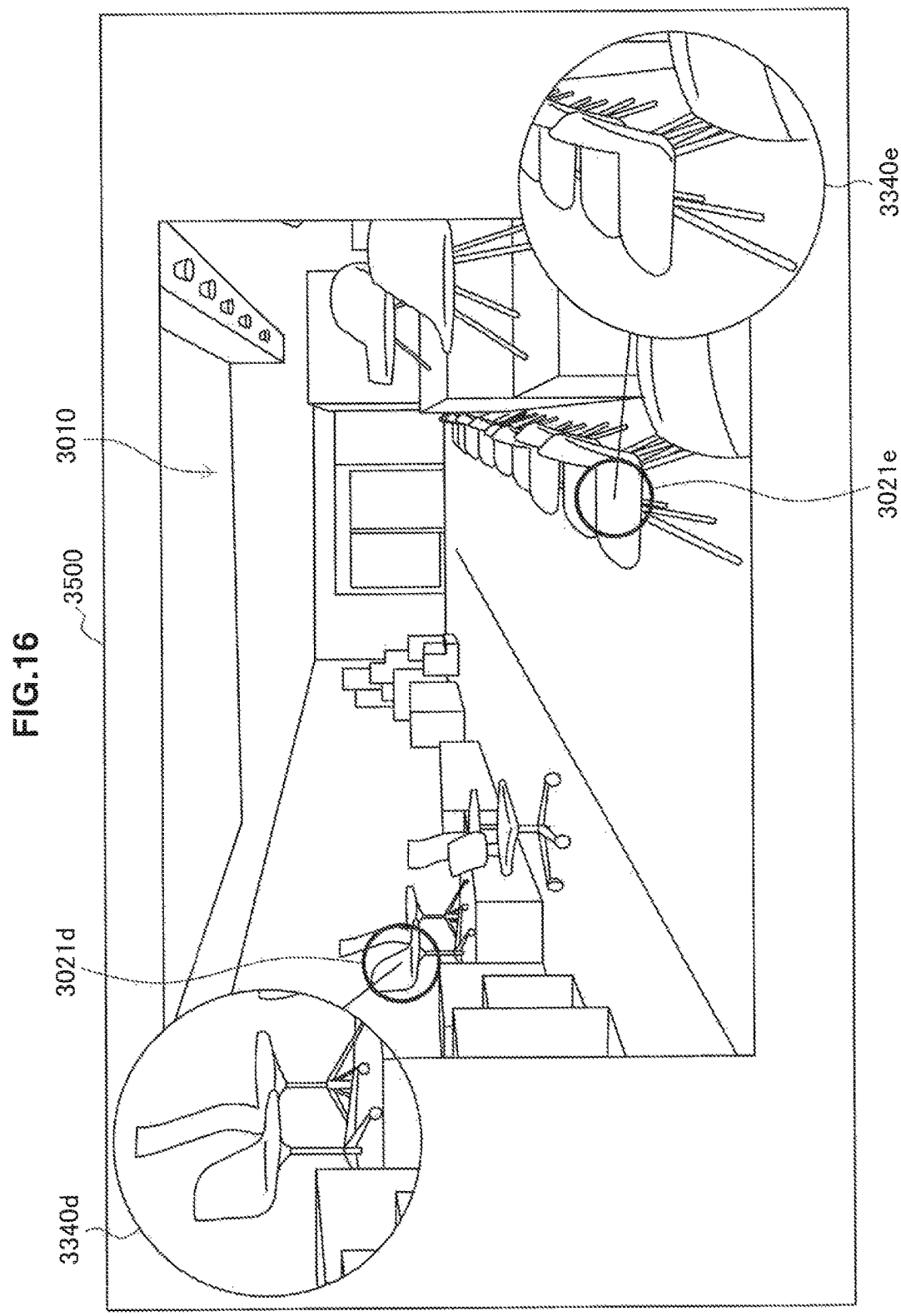
FIG. 16 is a diagram illustrating a third exemplary display in a third embodiment of the present disclosure.

FIG. 16 is a diagram illustrating the third exemplary display in the third embodiment of the present disclosure. Referring to FIG. 16, the moving image 3010, two markers 3021d, 3021e, and two enlarged images 3340d, 3340e corresponding to the respective markers are displayed in the screen image 3500. As illustrated in this third exemplary display, in the present embodiment, the display of the marker 3021, the object image 3022, and the enlarged image 3340 as illustrated in the above first exemplary display and the second exemplary display may be realized side by side for a plurality of the spatial positions in the moving image 3010.

In the above, the exemplary display of the third embodiment of the present disclosure has been described. Note that the examples which displays the image of the region corresponding to the specified spatial position in an enlarged manner are described, but the embodiment of the present disclosure is not limited to the example like this. For example, in the same way as the above exemplary display, the image of the region corresponding to the specified spatial position may be displayed at a high resolution. At this time, the image of the region may be enlarged, or may not be enlarged.

Also, for example, the image of the region corresponding to the specified spatial position may not be enlarged, and may not be displayed at a high resolution. That is, in the display 340 of the tablet terminal 300, the image of the region corresponding to the spatial position that the second user specifies may be displayed in the same way in another box even after the frame is changed. In this case as well, since the position where the image of the region corresponding to the specified spatial position is displayed does not fluctuate by the change of viewpoint, the user can easily and continually view the object that is at the spatial position for example.

3-3. Variant Example

Figure 17:
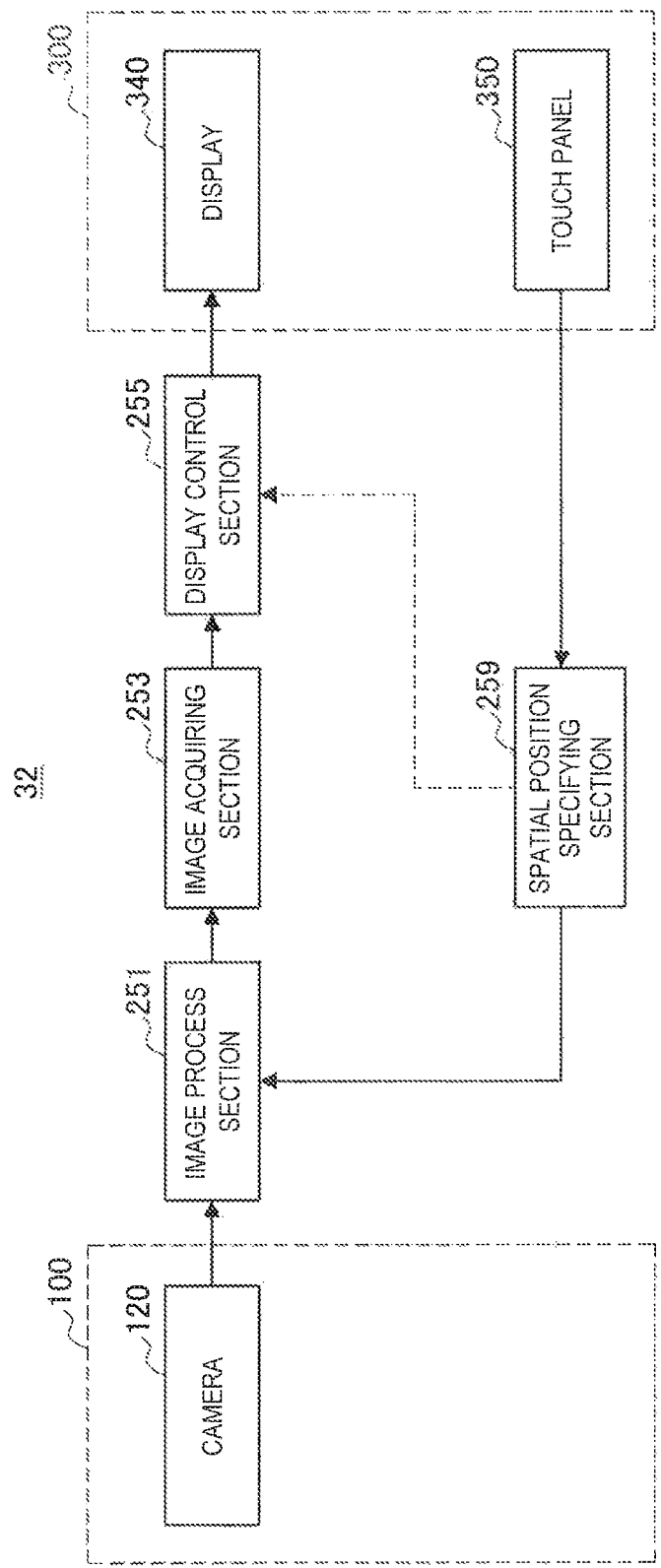
FIG. 17 is a diagram illustrating a schematic functional configuration of a system according to a variant example of a third embodiment of the present disclosure.

FIG. 17 is a diagram illustrating a schematic functional configuration of the system according to the variant example of the third embodiment of the present disclosure. Referring to FIG. 17, the system 32 does not include the object recognizing section. The spatial position specifying section 259 provides the information representing the spatial position in the moving image that the second user who uses the tablet terminal 300 specifies using the touch panel 350, to the image process section 251 or the display control section 255. According to the present variant example, even when the object does not exist at the spatial position specified by the second user for example, the display control section 255 can display the moving image in such a manner to maintain the spatial position in a predetermined state.

In the example of the present embodiment described above, the object recognizing section 257 executes the object recognition at or near the spatial position that the second user specifies, and the spatial position corresponding to the recognized object is specified by the spatial position specifying section 259. This is because specifying the spatial position accurately becomes possible by using the object as a medium, when some sort of object exists at the spatial position that the second user wish to specify, for example. Accordingly, when the second user can specify the spatial position more accurately by the improvement of the operation interface for specifying the spatial position, by the provision of the operation support information, or the like for example, the spatial position may not necessarily be specified using the object as a medium. In that case, the spatial position specified by the second user is specified by the spatial position specifying section 259 directly, as in the present variant example.

4. Hardware Configuration

Figure 18:
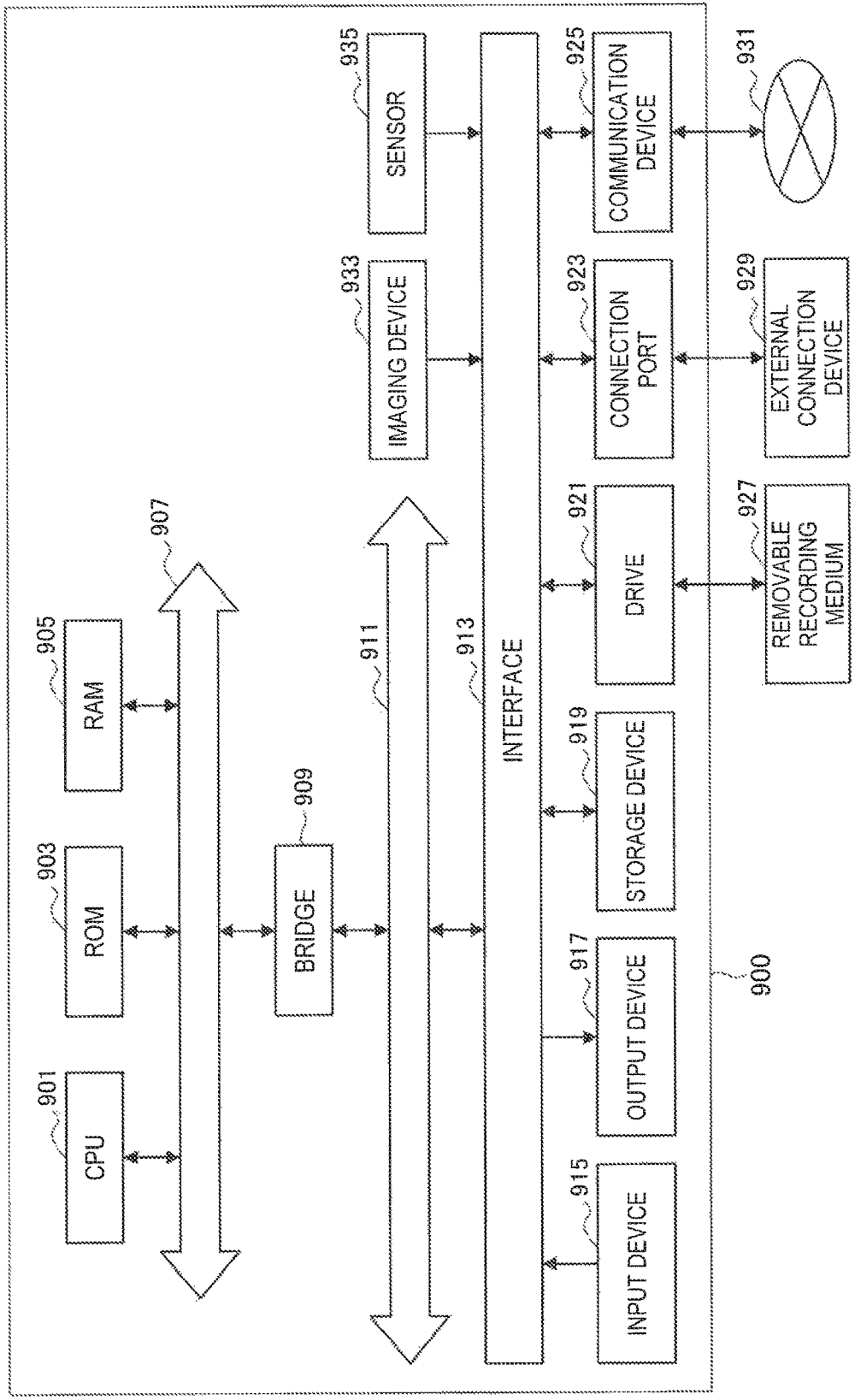
FIG. 18 is a block diagram for describing a hardware configuration capable of implementing an information processing apparatus according to an embodiment of the present disclosure.

Next, with reference to FIG. 18, description will be made of the hardware configuration of the information processing apparatus according to the embodiment of the present disclosure. FIG. 18 a block diagram for describing the hardware configuration capable of implementing the information processing apparatus according to the embodiment of the present disclosure. The information processing apparatus 900 illustrated in the drawing realizes, for example, the smartphone 150, the server 200, the tablet terminal 300, and the like, in the above embodiments.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

5. Supplement

The embodiment of the present disclosure includes, for example, the information processing apparatuses (the smartphone, the server, the tablet terminal, and the like) describe above, a system, an information processing method executed in the information processing apparatus or the system, a program causing the information processing apparatus to function, and a non-transitory tangible medium having a program stored therein.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A display control device including:
an image acquiring section configured to acquire a moving image shot from a viewpoint changing from moment to moment;
a spatial position specifying section configured to specify a spatial position in a first frame of the moving image; and
a display control section configured to display the moving image, in such a manner to maintain the spatial position in a predetermined state in a second frame after the first frame.

(2) The display control device according to (1), wherein
the image acquiring section acquires the moving image corresponding to a sight of a first user, and
the display control section displays the moving image toward a second user that is different from the first user.

(3) The display control device according to (2), wherein
the display control section displays the moving image in such a manner to maintain the spatial position in a state marked as a candidate of a position to be related to an annotation that the second user inputs.

(4) The display control device according to (3), further including:
an object recognizing section configured to recognize an object included in the first frame,
wherein the spatial position specifying section specifies a spatial position corresponding to the object.

(5) The display control device according to (4), wherein
the display control section displays the moving image in such a manner to maintain the spatial position in a state displayed and related to related information of the object.

(6) The display control device according to (4), wherein
the object recognizing section recognizes the object at or near a spatial position specified by the second user.

(7) The display control device according to (4), wherein
the object recognizing section recognizes the object in a region corresponding to a gazing scope of the first user.

(8) The display control device according to (1), wherein
the display control section displays the moving image in such a manner to maintain the spatial position in an enlarged state.

(9) The display control device according to (1), wherein
the display control section displays the moving image in such a manner to maintain the spatial position in a state displayed at a resolution higher than other parts.

(10) The display control device according to (1), wherein
the display control section displays the moving image in such a manner to maintain the spatial position in a state displayed in another box, when the spatial position is not included in the second frame.

(11) The display control device according to (10), wherein
the image acquiring section acquires a frame of the moving image generated by cutting out a surrounding region of a source moving image, and an image of the spatial position cut out from the surrounding region, in the second frame.

(12) The display control device according to (10), wherein
the display control section displays an image of the another box in the second frame, using an image cut out from a frame that is same as or previous to the second frame and includes the spatial position.

(13) A display control method including:
acquiring a moving image shot from a viewpoint changing from moment to moment;
specifying a spatial position in a first frame of the moving image; and
displaying the moving image in such a manner to maintain the spatial position in a predetermined state in a second frame after the first frame.

(14) A program for causing a computer to implement:
a function to acquire a moving image shot from a viewpoint changing from moment to moment;

a function to specify a spatial position in a first frame of the moving image; and a function to display the moving image in such a manner to maintain the spatial position in a predetermined state in a second frame after the first frame.

What is claimed is:

1. A server comprising:
at least one processor configured to:
acquire a moving image related to a first display terminal;
acquire information of a spatial position of a recognized object included in the moving image;
send the moving image and the acquired information of the spatial position to a second display terminal to maintain a displaying of a marker image in correspondence with the spatial position of the recognized object, wherein the marker image indicates that the recognized object is selectable by the second display terminal;
receive annotation information on the recognized object which is displayed along with the marker image and which is selected with the second display terminal;
send the annotation information to the first display terminal to associate an annotation image corresponding to the annotation information with the spatial position of the selected recognized object on the first display terminal to enable display, on the second display terminal, of the annotation image indicating an association with the marker image, wherein the annotation image is displayed within the moving image and contains an image having an appearance substantially equal to that of the selected recognized object; and
control the second display terminal to display the annotation image at least partially outside of the moving image when determining that the spatial position of the recognized object is outside of the moving image.

2. The server according to claim 1, wherein the moving image is displayed on the second display terminal so as to maintain the spatial position of the selected recognized object.

3. The server according to claim 1, wherein the at least one processor is further configured to recognize an object at or near a spatial position specified by a user.

4. The server according to claim 1, wherein the at least one processor is further configured to recognize an object in a region corresponding to a gazing scope of a user.

5. The server according to claim 1, wherein the moving image is displayed on the second display terminal so as to maintain the spatial position in an enlarged state.

6. The server according to claim 1, wherein the moving image is displayed on the second display terminal so as to maintain the spatial position in a state displayed at a resolution higher than other parts.

7. The server according to claim 1, wherein the moving image is displayed on the second display terminal so as to maintain the spatial position in a state displayed in another box.

8. The server according to claim 7, wherein the at least one processor is further configured to acquire a frame of the moving image generated by cutting out a surrounding region of a source moving image, and an image of the spatial position cut out from the surrounding region.

9. The server according to claim 7, wherein an image of the another box is displayed on the second display terminal using an image cut out from a of the moving image and including the spatial position.

10. The server according to claim 1, wherein more than one marker image is displayed on the second display terminal in correspondence with the spatial position of the recognized object.

11. The server according to claim 1, wherein the annotation image is further configured to be displayed in accordance with the spatial position of the selected recognized object.

12. The server according to claim 1, wherein the annotation information is displayed on the second display terminal based on the spatial position of the selected recognized object to indicate association with the annotation image.

13. The server according to claim 1, wherein the annotation image is a partial cut out of the moving image.

14. A display control method, the method being executed via at least one processor, and comprising:
acquiring a moving image related to a first display terminal;
acquiring information of a spatial position of a recognized object included in the moving image;
sending the moving image and the acquired information of the spatial position to a second display terminal to maintain a displaying of a marker image in correspondence with the spatial position of the recognized object, wherein the marker image indicates that the recognized object is selectable by the second display terminal;
receiving annotation information on the recognized object which is displayed along with the marker image and which is selected with the second display terminal;
sending the annotation information to the first display terminal to associate an annotation image corresponding to the annotation information with the spatial position of the selected recognized object on the first display terminal to enable a displaying, on the second display terminal, of the annotation image indicating an association with the marker image, wherein the annotation image is displayed within the moving image and contains an image having an appearance substantially equal to that of the selected recognized object; and
controlling the second display terminal to display the annotation image at least partially outside of the moving image when determining that the spatial position of the recognized object is outside of the moving image.

15. A non-transitory computer-readable storage medium having stored thereon a program, which when executed by a computer causes the computer to execute a method, the method comprising:
acquiring a moving image related to a first display terminal;
acquiring information of a spatial position of a recognized object included in the moving image; and
sending the moving image and the acquired information of the spatial position to a second display terminal to maintain a displaying of a marker image in correspondence with the spatial position of the recognized object, wherein the marker image indicates that the recognized object is selectable by the second display terminal;
receiving annotation information on the recognized object which is displayed along with the marker image and which is selected with the second display terminal;
sending the annotation information to the first display terminal to associate an annotation image corresponding to the annotation information with the spatial position of the selected recognized object on the first display terminal to enable a displaying, on the second display terminal, of the annotation image indicating an association with the marker image, wherein the annotation image is displayed within the moving image and contains an image having an appearance substantially equal to that of the selected recognized object; and controlling the second display terminal to display the annotation image at least partially outside of the moving image when determining that the spatial position of the recognized object is outside of the moving image.

16. An information processing apparatus comprising:

at least one processor configured to:
  acquire a moving image captured by a camera of an external terminal;
  acquire information of a spatial position of a recognized object included in the moving image;
  control a display device to display the moving image and a marker image to correspond to the spatial position of the recognized object within the moving image;
  acquire a user input to select the recognized object to which the marker image is attached;
  control the display device to add, within the moving image, an annotation image corresponding to the selected recognized object, wherein the annotation image is displayed within the moving image and contains an image having an appearance substantially equal to that of the selected recognized object; and
  control the display device to display the annotation image at least partially outside of the moving image when determining that the spatial position of the recognized object is outside of the moving image.

17. The information processing apparatus according to claim 16, wherein the at least one processor is further configured to control the display device to display the annotation image as an enlarged moving image within the moving image, the enlarged moving image representing a part of the moving image.

* * * * *